United States Patent
Kusunoki et al.

(10) Patent No.: US 10,097,039 B2
(45) Date of Patent: Oct. 9, 2018

(54) WIRELESS POWER TRANSMISSION SYSTEM FOR TRANSMITTING ALTERNATING-CURRENT POWER WIRELESSLY

(71) Applicant: FURUKAWA ELECTRIC CO., LTD., Tokyo (JP)

(72) Inventors: Masahiro Kusunoki, Tokyo (JP); Mitsuru Masuda, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 436 days.

(21) Appl. No.: 14/813,074

(22) Filed: Jul. 29, 2015

(65) Prior Publication Data

US 2015/0333539 A1    Nov. 19, 2015

Related U.S. Application Data

(63) Continuation of application No. PCT/JP2013/081826, filed on Nov. 27, 2013.

(30) Foreign Application Priority Data

Jan. 31, 2013   (JP) .................... 2013-017774

(51) Int. Cl.
*H02J 5/00* (2016.01)
*H02J 50/12* (2016.01)
(Continued)

(52) U.S. Cl.
CPC .............. *H02J 50/12* (2016.02); *H02J 5/005* (2013.01); *H02J 7/025* (2013.01); *H02J 50/05* (2016.02)

(58) Field of Classification Search
CPC . H02J 5/005; H02J 50/05; H02J 17/00; H04B 5/0037; H04B 5/0012
See application file for complete search history.

(56) References Cited

U.S. PATENT DOCUMENTS 9,531,442 B2 * 12/2016 Ichikawa ............. H04B 5/0037
9,824,817 B2 * 11/2017 Kusunoki ............... H02J 50/50
(Continued)

FOREIGN PATENT DOCUMENTS

JP   H8-340285    12/1996
JP   2004-038254   2/2004
(Continued)

OTHER PUBLICATIONS

International Search Report dated Jan. 7, 2014 for International Application No. PCT/JP2013/081826, 6 pages.

*Primary Examiner* — Jared Fureman
*Assistant Examiner* — Michael Warmflash
(74) *Attorney, Agent, or Firm* — Amin, Turocy & Watson, LLP

(57) ABSTRACT

[OBJECT] There is provided a wireless power transmission system capable of transmitting power efficiently even when it is rotated.
[ORGANIZATION] A power transmission device has a first and a second electrode (a center electrode 311 and an annular electrode 312) each having a rotationally symmetrical shape with respect to a common center axis, a first and a second connection line (connection lines 315, 316), and a first inductor to (inductor 313, 314). A power reception device has a third and a fourth electrode (center electrode 321 and annular electrode 322) each having a rotationally symmetrical shape with respect to a common center axis, a third and a fourth connection line (connection lines 325, 326), and a second inductor. The electrodes of the power transmission device and the power reception device are disposed to oppose each other across a distance of $\lambda/2\pi$ or less as a near field, and a resonance frequency of a coupler constituted of the first and the second electrode and the first inductor and a resonance frequency of a coupler constituted (Continued)

of the third and the fourth electrode and the second inductor (inductor 323, 324) are set to be substantially equal.

4 Claims, 30 Drawing Sheets

(51) Int. Cl.
    *H02J 7/02* (2016.01)
    *H02J 50/05* (2016.01)

(56) References Cited

U.S. PATENT DOCUMENTS

| | | | |
|---|---|---|---|
| 2009/0302690 A1* | 12/2009 | Kubono | H02J 17/00 307/109 |
| 2012/0019076 A1* | 1/2012 | Urano | H04B 5/0037 307/104 |
| 2012/0146431 A1* | 6/2012 | Ichikawa | H02J 7/025 307/149 |
| 2012/0146574 A1* | 6/2012 | Ichikawa | H02J 7/025 320/107 |
| 2012/0299392 A1* | 11/2012 | Ichikawa | H02J 5/005 307/109 |
| 2013/0002048 A1* | 1/2013 | Ichikawa | H02M 5/10 307/149 |
| 2013/0009488 A1* | 1/2013 | Choe | H02J 5/005 307/104 |
| 2014/0167525 A1* | 6/2014 | Van Goor | H04B 5/0012 307/104 |
| 2014/0175907 A1* | 6/2014 | Takahashi | H02J 17/00 307/149 |
| 2014/0327321 A1* | 11/2014 | Kusunoki | H01F 38/14 307/104 |
| 2015/0333539 A1* | 11/2015 | Kusunoki | H02J 5/005 307/104 |

FOREIGN PATENT DOCUMENTS

| | | | | |
|---|---|---|---|---|
| JP | 2004-348496 | 12/2004 | | |
| JP | 2009-296857 | 12/2009 | | |
| JP | 2012-175869 | 9/2012 | | |
| WO | 2010-014634 | 2/2010 | | |
| WO | WO 2013024391 A1 * | 2/2013 | | H04B 5/0012 |

* cited by examiner

WIRELESS POWER TRANSMISSION SYSTEM FOR TRANSMITTING ALTERNATING-CURRENT POWER WIRELESSLY

CROSS-REFERENCE TO RELATED APPLICATIONS

This application is a continuation application of, and claims priority to, International Application No. PCT/JP2013/081826, filed Nov. 27, 2013 and entitled "WIRELESS POWER TRANSMISSION SYSTEM", which claims priority to Japanese Patent Application No. 2013-017774, filed Jan. 31, 2013, the disclosures of each of which are incorporated herein by reference in their entireties.

TECHNICAL FIELD

The present invention relates to a wireless power transmission system.

BACKGROUND ART

Patent Document 1 discloses a wireless power transmission device which performs transmission of power between two non-contact electric circuits by using electromagnetic induction.

PRIOR ART DOCUMENT

Patent Document

Patent Document 1: Japanese Patent Application Laid-open No. H8-340285

SUMMARY OF THE INVENTION

Problems to be Solved by the Invention

Incidentally, in the technology disclosed in Patent Document 1, power loss in a coil for transmitting power is large, and thus there is a problem that power cannot be transmitted efficiently. Further, in a second embodiment illustrated in FIG. 11, when it is rotated about an axis of the coupler, the coil for transmitting power is displaced in position and changes in characteristics, and thus there is a problem that power cannot be transmitted efficiently.

Accordingly, it is an object of the present invention to provide a wireless power transmission system capable of transmitting power efficiently even when it is rotated.

Means for Solving the Problems

In order to solve the above problems, the present invention is characterized by a wireless power transmission system transmitting alternating-current power from a power transmission device to a power reception device, wherein the power transmission device has: a first and a second electrode which are disposed across a predetermined distance, in which a total width including the predetermined distance is $\lambda/2\pi$ or less as a near field, the first and the second electrode each having a rotationally symmetrical shape with respect to a common center axis; a first and a second connection line electrically connecting the first and the second electrode and two output terminals of an alternating-current power generating unit, respectively; and a first inductor residing between the first and the second electrode and at least one of the two output terminals of the alternating current power generating unit, and the power reception device has: a third and a fourth electrode which are disposed across a predetermined distance, in which a total width including the predetermined distance is $\lambda/2\pi$ or less as a near field, the third and the fourth electrode each having a rotationally symmetrical shape with respect to a common center axis; a third and a fourth connection line electrically connecting the third and the fourth electrode and two input terminals of a load, respectively; and a second inductor residing between the third and the fourth electrode and at least one of the two input terminals of the load, wherein the electrodes of the power transmission device and the power reception device are disposed to oppose each other across a distance of $\lambda/2\pi$ or less as a near field, and a resonance frequency of a coupler constituted of the first and the second electrode and the first inductor and a resonance frequency of a coupler constituted of the third and the fourth electrode and the second inductor are set to be substantially equal.

With such a structure, power can be transmitted efficiently even when it is rotated.

Further, one aspect of the present invention is characterized in that the first electrode has a platy polygonal or circular shape, and the second electrode has a platy polygonal or circular annular shape disposed to surround the first electrode and is disposed on a same plane to have a center axis corresponding to that of the first electrode; the third electrode has a platy polygonal or circular shape, and the fourth electrode has a platy polygonal or circular annular shape disposed to surround the third electrode and is disposed on a same plane to have a center axis corresponding to that of the third electrode; and the first and the second electrode and the third and the fourth electrode are disposed to oppose each other across a distance of $\lambda/2\pi$ or less as a near field.

With such a structure, even when it is rotated around an axis, decrease in transmission efficiency can be prevented reliably.

Further, one aspect of the present invention is characterized in that at least one of the first to the fourth electrode has a cutout in a radial direction.

With such a structure, a cutout for attaching an electrode can be provided without leading to deterioration in characteristics.

Further, one aspect of the present invention is characterized in that at least one of the first electrode and the third electrode has an annular shape.

With such a structure, a through hole for attaching an electrode can be provided without leading to deterioration in characteristics.

Further, one aspect of the present invention is characterized in that at least one of the first to the fourth electrode has a three-dimensional structure extending in an axial direction.

With such a structure, a member having a three-dimensional shape can be used as an electrode.

Further, one aspect of the present invention is characterized in that the first and the second electrode have a polygonal or circular cylindrical shape and the third and the fourth electrode have a polygonal or circular cylindrical shape disposed to surround the first and the second electrode, respectively, and are disposed to have a center axis corresponding to that of the first and the second electrode, and the first and the third electrode and the second and the fourth electrode are disposed to oppose each other across a distance of $\lambda/2\pi$ or less as a near field.

With such a structure, even when it is rotated around an axis, decrease in transmission efficiency can be prevented reliably.

Effect of the Invention

According to the present invention, it is possible to provide a wireless power transmission system capable of transmitting power efficiently even when it is rotated.

BEST MODE FOR CARRYING OUT THE INVENTION

Next, embodiments of the present invention will be described.

(A) Description of a Wireless Transmission System Utilizing Series Resonance

Hereinafter, a wireless power transmission system utilizing series resonance will be described, and thereafter embodiments of the present invention will be described.

Figure 1:
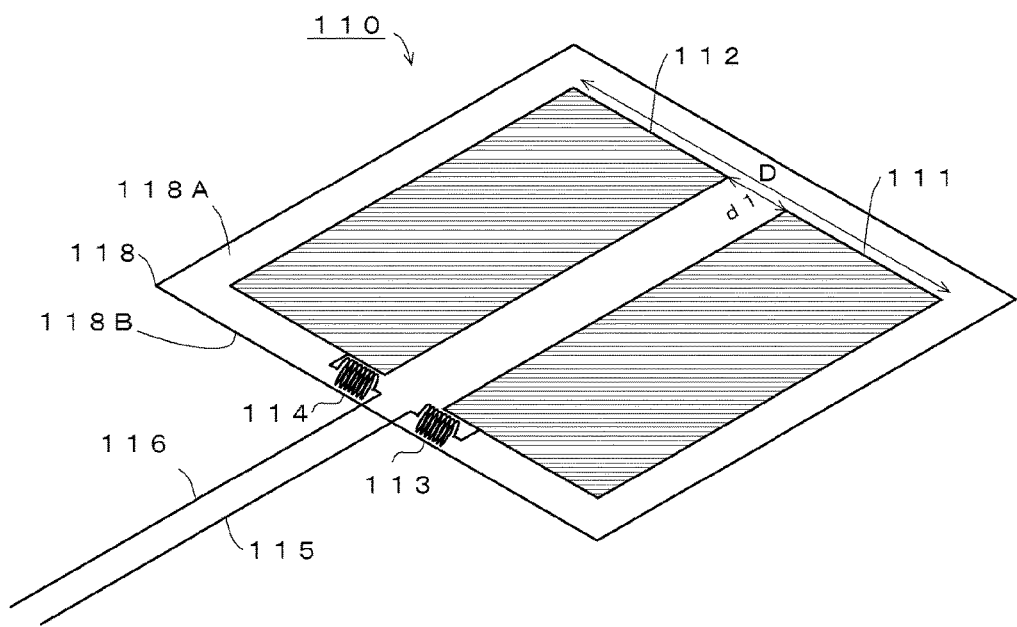
FIG. 1 is a view illustrating a detailed structural example of a power transmission device constituting a wireless power transmission system utilizing series resonance.

FIG. 1 illustrates a detailed structural example of a power transmission coupler constituting a wireless power transmission system utilizing series resonance. As illustrated in this view, in the wireless power transmission system utilizing series resonance, a power transmission coupler 110 is formed by disposing electrodes 111, 112 constituted of a conductive member having a rectangular shape on a front surface 118A of a circuit board 118 constituted of an insulating member (dielectric substrate) having a rectangular plate shape. On a rear surface 118B of the circuit board 118, in this example of FIG. 1, electrodes and so on are not disposed. As a specific structural example, for example, on the circuit board 118 constituted of a glass epoxy substrate, a glass composite substrate, or the like, the electrodes 111, 112 are formed of a conductive thin film of copper or the like. The electrodes 111, 112 are disposed in parallel at positions separated by a predetermined distance d1. Further, a width D of the electrodes 111, 112 including the distance d1 is set to be narrower than a near field denoted by $\lambda/2\pi$ where $\lambda$ is a wavelength of electric fields emitted from these electrodes.

Ends of inductors 113, 114 are connected to ends in a lateral direction of the electrodes 111, 112, respectively, of the circuit board 118. Further, other ends of the inductors 113, 114 are connected to one ends of connection lines 115, 116, respectively. The connection lines 115, 116 are disposed to avoid areas of the electrodes 111, 112 and an area sandwiched between them, and are also disposed to extend in a direction to depart from these areas (leftward and downward direction in FIG. 1). More particularly, they are disposed to avoid respective rectangular areas of the electrodes 111, 112 and the area sandwiched between these two electrodes 111, 112, and also disposed to extend in the direction to depart from these areas. By disposing in this manner, interference between the electrodes 111, 112 and the connection lines 115, 116 is decreased, and thus decrease in transmission efficiency can be prevented. The connection lines 115, 116 are, for example, constituted of a coaxial cable or a balanced cable. Note that other ends of the connection lines 115, 116 are connected respectively to output terminals of a not-illustrated alternating-current power generating unit. By connecting the alternating-current power generating unit to the power transmission coupler 110 by the connection lines 115, 116, a power transmission device is constituted.

The power transmission coupler 110 constitutes a series resonance circuit with capacitance C of a capacitor formed by disposing the electrodes 111, 112 across the predetermined distance d1 and inductance L of the inductors 113, 114, and thus has a peculiar resonance frequency $f_c$ due to them.

A power reception coupler 120 has the same structure as the power transmission coupler 110, and is formed by disposing electrodes 121, 122 constituted of a conductive member having a rectangular shape and inductors 123, 124 on a front surface 128A of a circuit board 128, and connecting connection lines 125, 126 to other ends of the inductors 123, 124. A resonance frequency $f_c$ of a series resonance circuit due to capacitance C of a capacitor formed by the electrodes 121, 122 and inductance L of the inductors 123, 124 is set to be substantially the same as that of the power transmission coupler 110. The connection lines 125, 126 are, for example, constituted of a coaxial cable or a balanced cable. A not-illustrated load is connected to other ends of the connection lines 125, 126 of the power reception coupler 120. By connecting the load to the power reception coupler 120 by the connection lines 125, 126, a power reception device is constituted.

Figure 2:
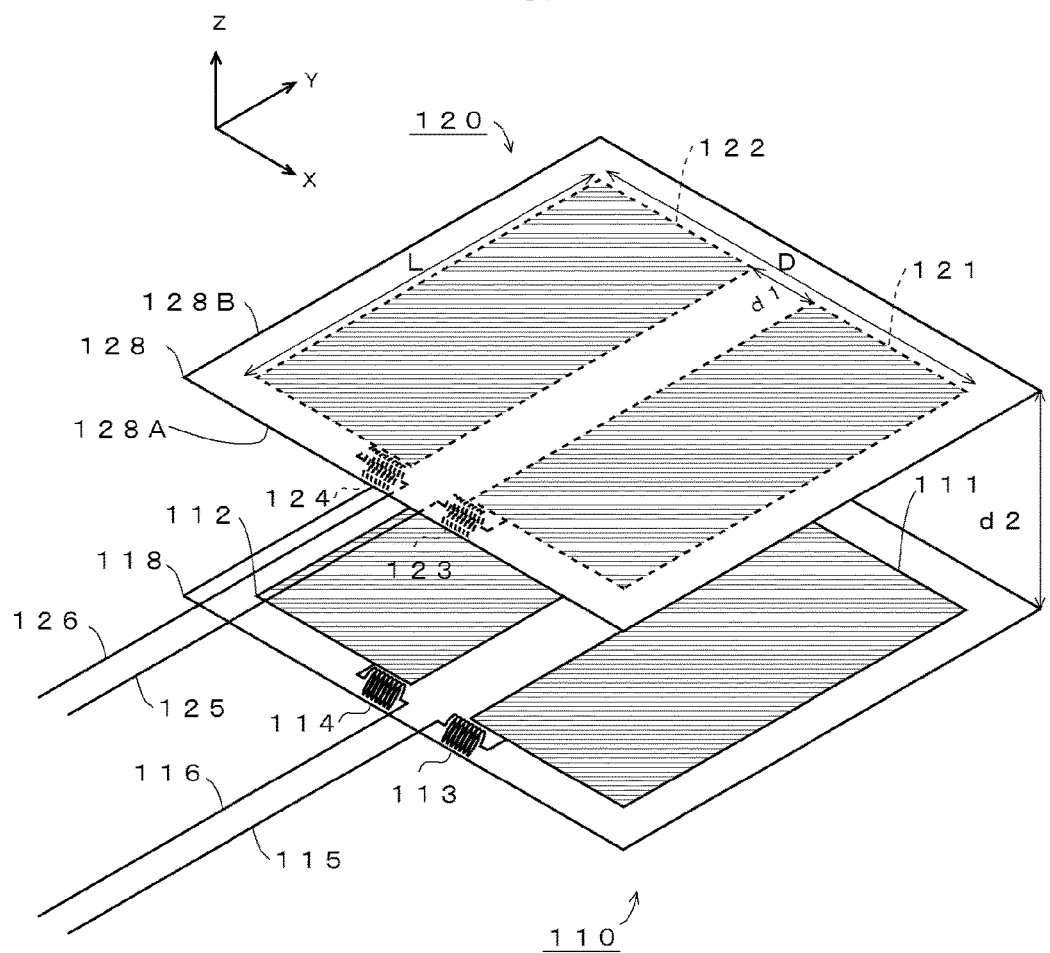
FIG. 2 is a view illustrating a structural example of the wireless power transmission system utilizing series resonance.

FIG. 2 is a view illustrating a state that the power transmission coupler 110 and the power reception coupler 120 are disposed to oppose each other. As illustrated in this view, the power transmission coupler 110 and the power reception coupler 120 are disposed so that the circuit boards 118, 128 are in parallel across a distance d2 and the front surfaces 118A, 128A of the circuit boards 118, 128 oppose each other.

Figure 3:
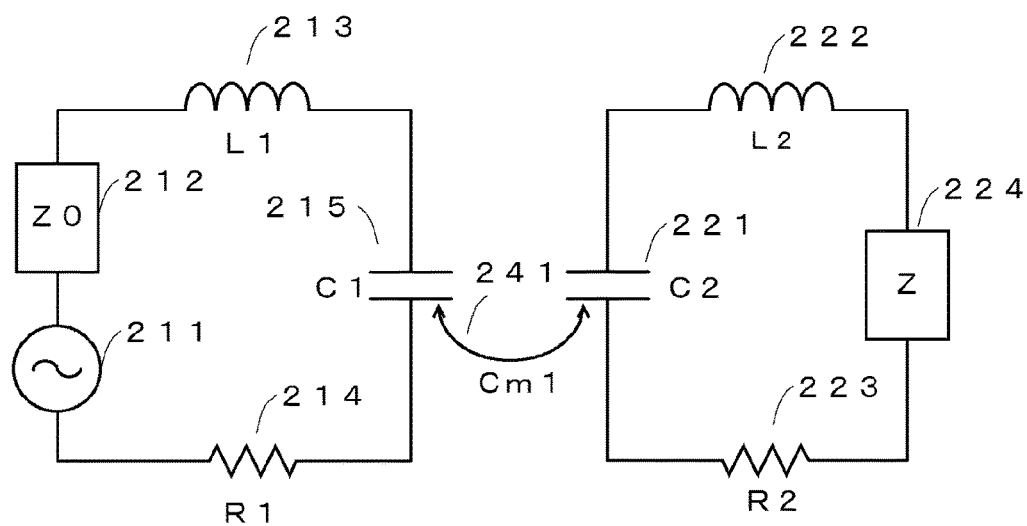
FIG. 3 is an equivalent circuit of the wireless power transmission system illustrated in FIG. 2.

FIG. 3 is a diagram illustrating an equivalent circuit of the wireless power transmission system 1 illustrated in FIG. 2. In FIG. 3, an alternating-current power generating unit 211 generates and outputs alternating-current power with a frequency corresponding to the resonance frequency. A power supply unit load 212 exhibits a value equal to characteristic impedances of the connection lines 115, 116 and the connection lines 125, 126, and has a value of Z0. An inductor 213 corresponds to the inductors 113, 114 and has an element value of L1. A resistor 214 exhibits resistance which accompanies a transmission side circuit, mainly the inductor, and has an element value of R1. A capacitor 215 is a capacitor of an element value C1 occurring between the electrodes 111, 112. A capacitor 221 is a capacitor of an element value C2 occurring between the electrodes 121, 122. An inductor 222 corresponds to the inductors 123, 124 and has an element value of L2. A resistor 223 exhibits resistance which accompanies a reception side circuit, mainly the inductor, and has an element value of R2. A load 224 is supplied with power outputted from the alternating-current power generating unit 211 and transmitted via the power transmission coupler and the power reception coupler. A capacitor 241 denotes a capacitor occurring between the electrodes 111, 112 and the electrodes 121, 122 and has an element value of Cm1. Note that the load 224 is, for example, constituted of a rectifying device, a secondary battery, and so on. Of course, it may be constituted of other elements.

Figure 4:
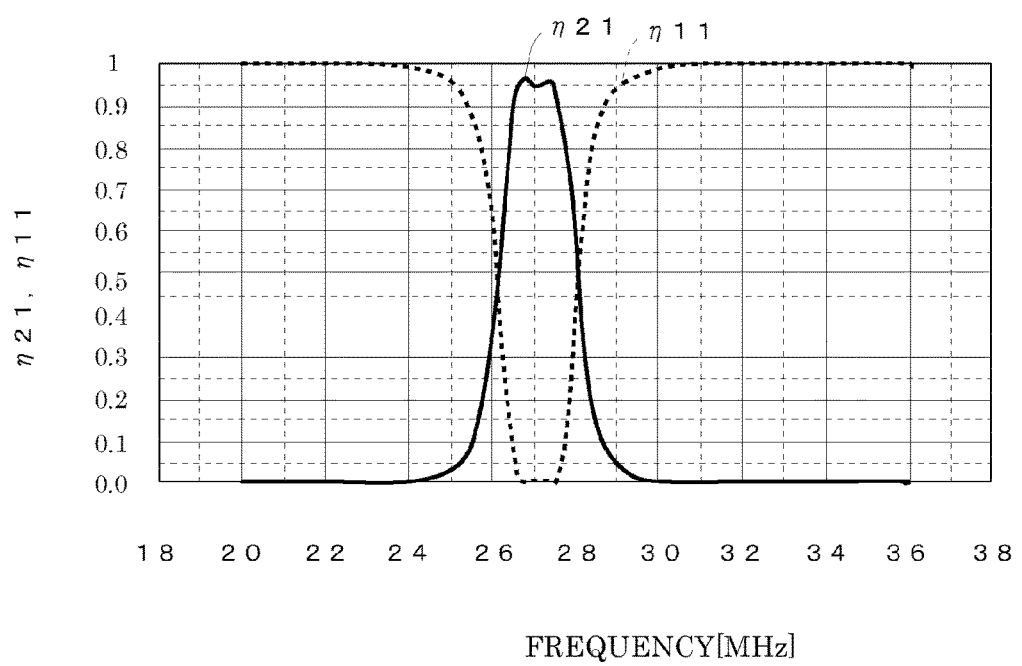
FIG. 4 is a diagram illustrating frequency characteristics of transmission efficiency and reflection loss of the wireless power transmission system illustrated in FIG. 2.

Next, operations of the wireless power transmission system utilizing series resonance illustrated in FIG. 2 will be described. FIG. 4 is a diagram illustrating frequency characteristics of transmission efficiency $\eta 21$ ($=|S21|^2$) from the power transmission coupler 110 to the power reception coupler 120 and reflection loss $\eta 11$ ($=|S11|^2$), in the case where the power transmission coupler 110 and the power reception coupler 120 of the wireless power transmission system illustrated in FIG. 2 are disposed to oppose each other across a distance of 20 cm (the case where d2=20 cm). In this diagram, the horizontal axis denotes frequency (MHz) of transmitted alternating-current power, and the vertical axis denotes transmission efficiency. In the example illustrated in FIG. 4, it can be seen that a transmission efficiency of about 95% is achieved around 27 MHz. Note that in FIG. 2, for example, the inductors 113, 114, 123, 124 are each wound 13 times and has an inductance value of 2.8 µH, sizes (D and L) of the circuit boards 118, 128 are 250×250 mm, and the gap d1 between the electrodes 111, 112 and the electrodes 121, 122 is 34.4 mm.

Figure 5:
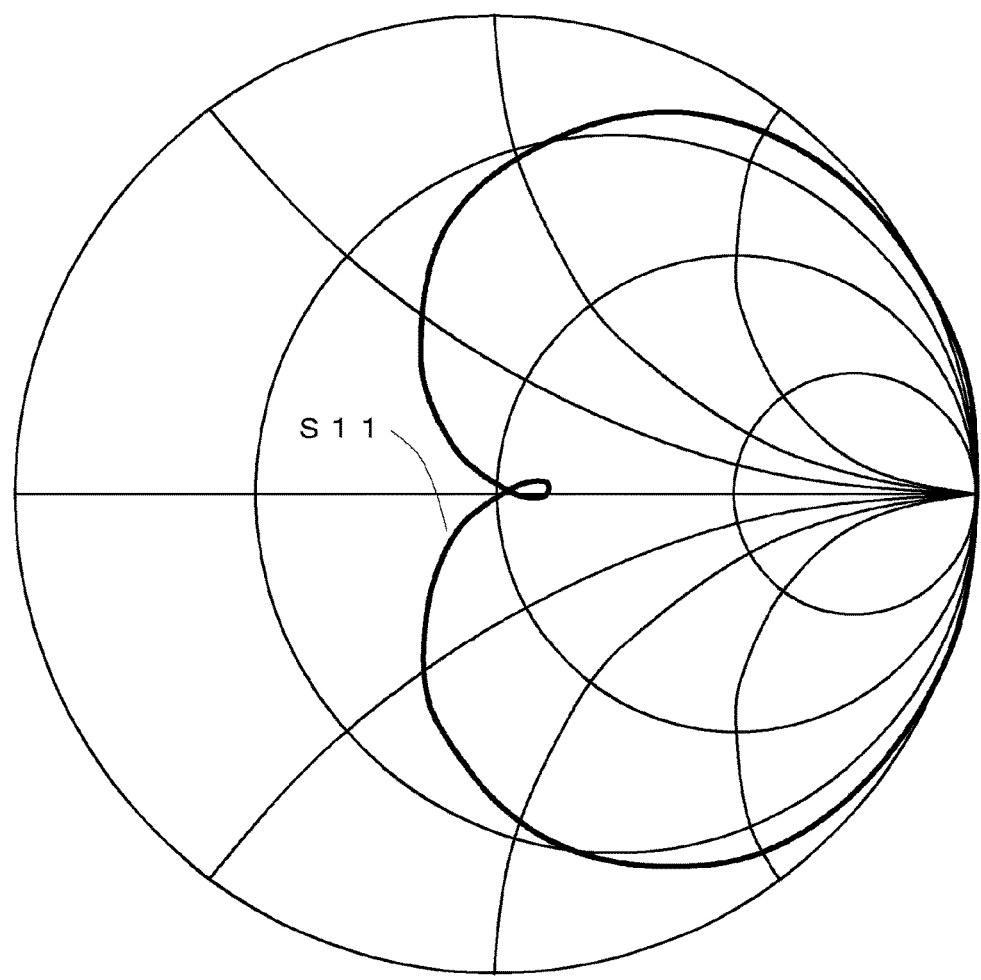
FIG. 5 is a diagram illustrating a smith chart of impedance of a power transmission coupler illustrated in FIG. 2.

FIG. 5 illustrates a smith chart of impedance S11 of the power transmission coupler 110 of the wireless power transmission system utilizing series resonance illustrated in FIG. 2. In this case, a port impedance of the measuring apparatus is set to a value equal to a characteristic impedance Z0 (real value) of a connection line. As illustrated in these diagrams, in the wireless power transmission system illustrated in FIG. 2, a trajectory of impedance of the power transmission coupler 110 and the power reception coupler 120 passes near the center of circle of the smith chart, and thus power can be transmitted efficiently while suppressing reflections by setting to perform transmission near the center.

Figure 6:
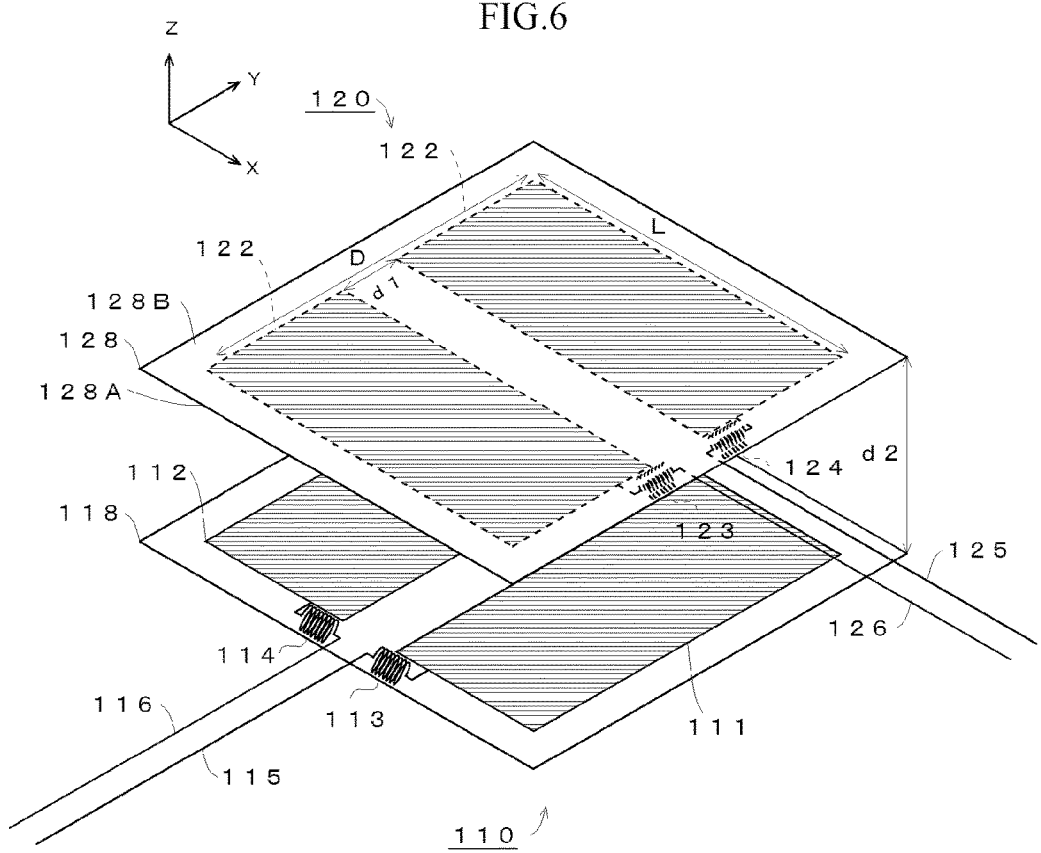
FIG. 6 is a view illustrating a state of the case where a power reception coupler illustrated in FIG. 2 is rotated 90 degrees.
Figure 7:
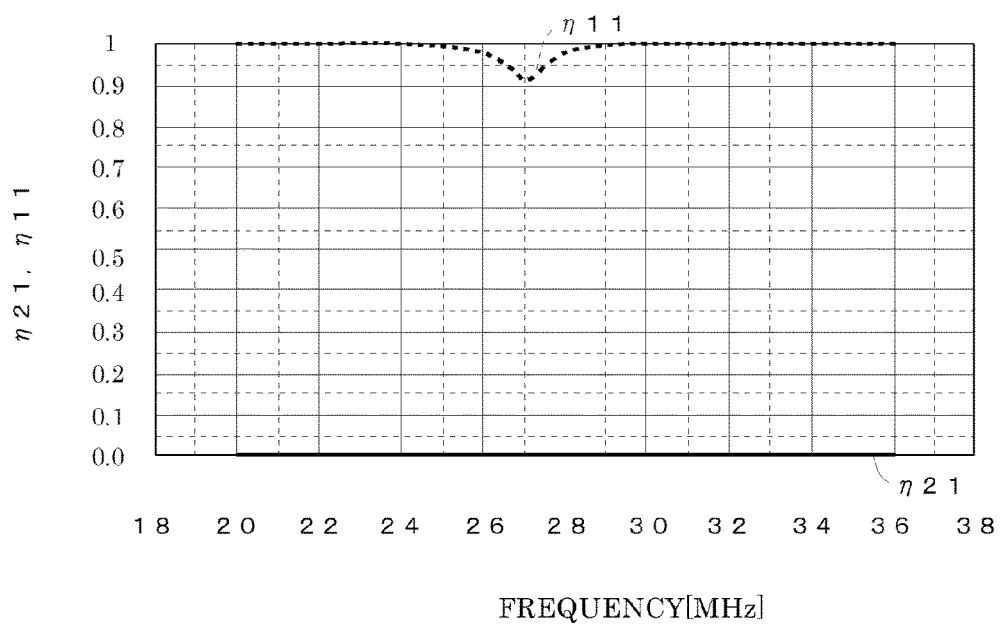
FIG. 7 is a diagram illustrating frequency characteristics of transmission efficiency and reflection loss of the wireless power transmission system illustrated in FIG. 6.
Figure 8:
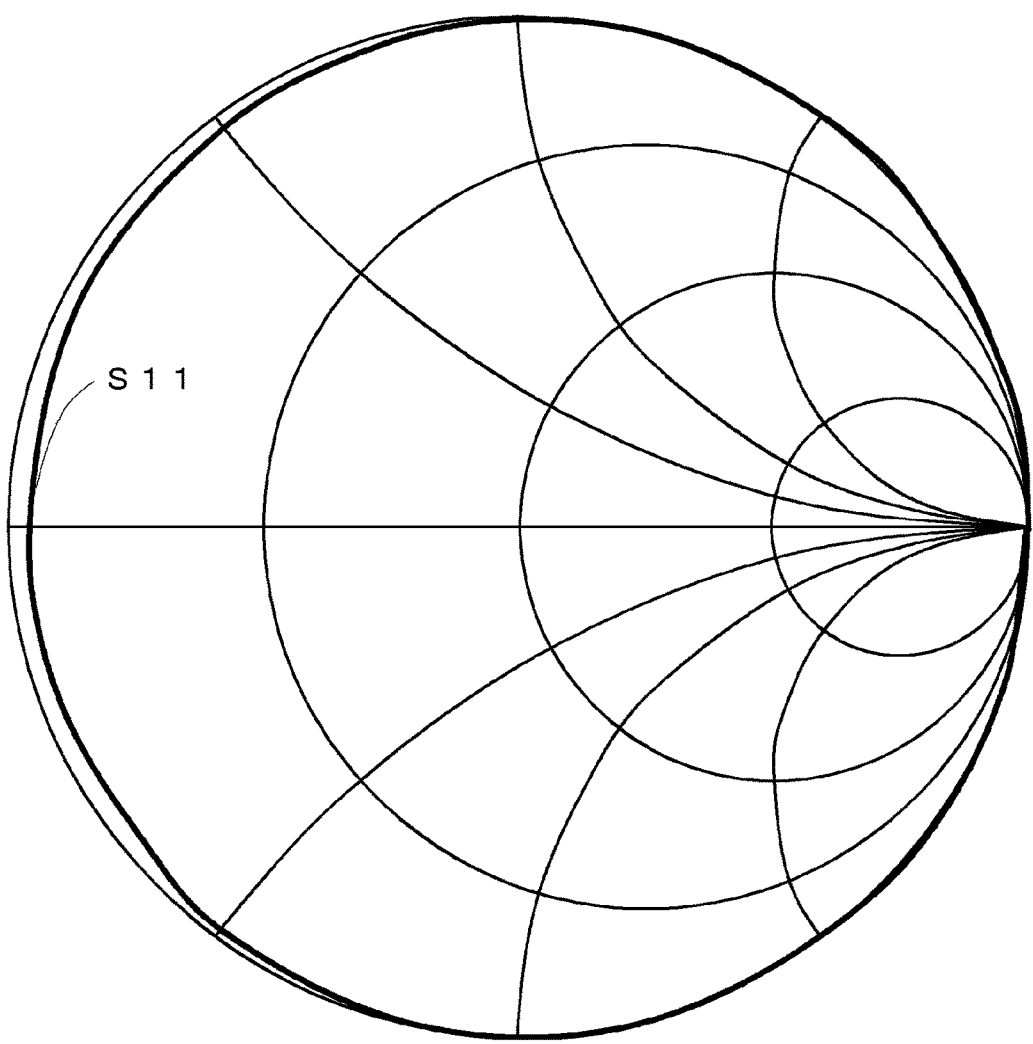
FIG. 8 is a diagram illustrating a smith chart of impedance of a power transmission coupler illustrated in FIG. 6.

FIG. 6 is a view illustrating a state that the power reception coupler 120 of the wireless power transmission system illustrated in FIG. 2 is disposed by rotating 90 degrees counterclockwise. FIG. 7 is a diagram illustrating frequency characteristics of transmission efficiency $\eta 21$ from the power transmission coupler 110 to the power reception coupler 120 and reflection loss $\eta 11$ in the disposition state of FIG. 6. As illustrated in FIG. 7, the transmission efficiency $\eta 21$ becomes 0 and the reflection loss $\eta 11$ becomes a value close to 1, and thus most of the power inputted to the power transmission coupler 110 is reflected and not transmitted to the power reception coupler 120. Further, as illustrated in FIG. 8, it becomes a state that the input impedance S11 is low, and a state that the impedance does not match. Thus, in the wireless power transmission system illustrated in FIG. 2, power cannot be transmitted in a state that the power transmission coupler 110 and the power reception coupler 120 are orthogonal as illustrated in FIG. 6. From the above, in the wireless power transmission system illustrated in FIG. 2, when the power transmission coupler 110 and the power reception coupler 120 are rotated about an axis, it leads to deterioration in characteristics.

(B) Description of Embodiments of the Present Invention

Figure 9:
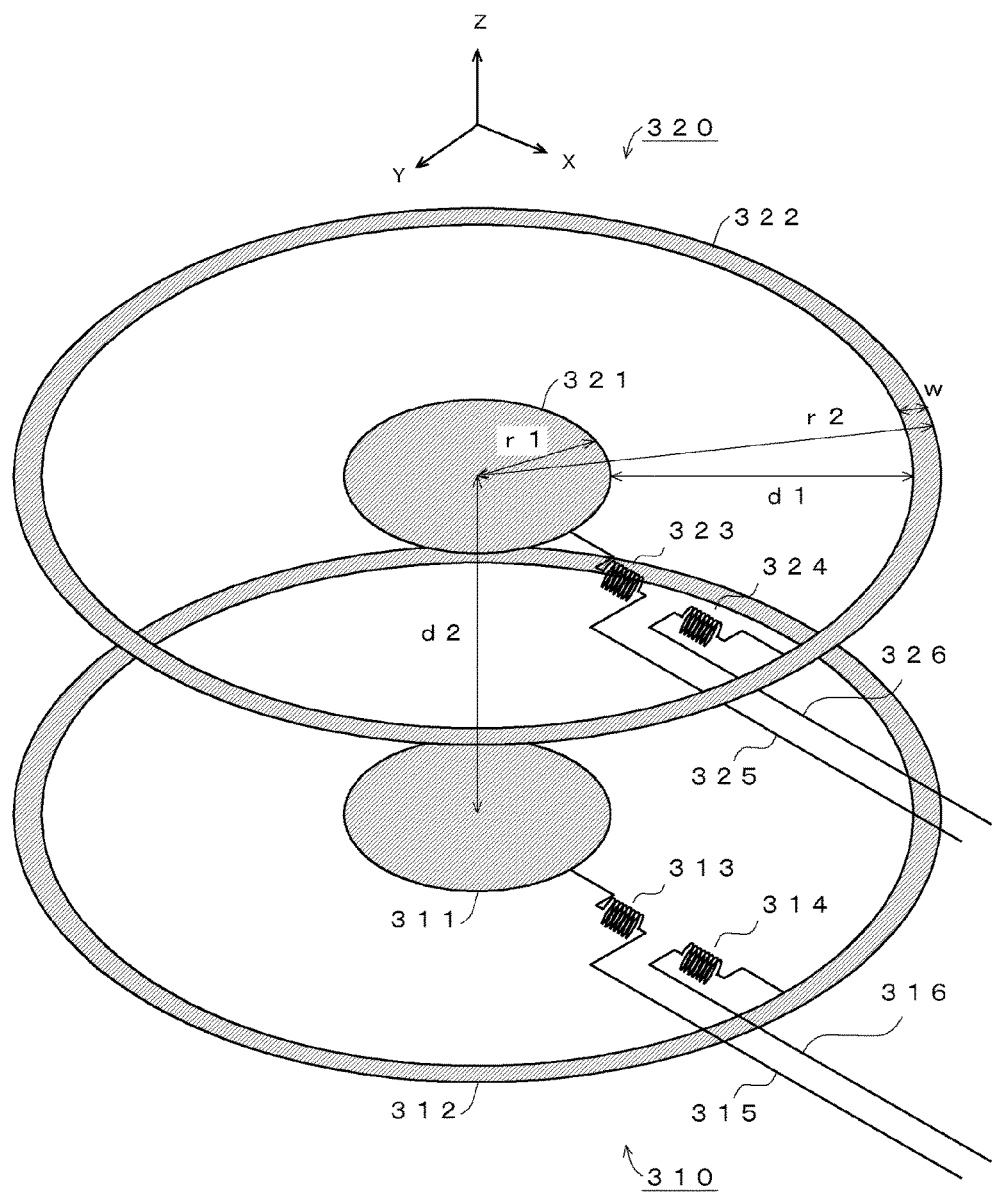
FIG. 9 is a perspective view illustrating a structural example of an embodiment of the present invention.
Figure 10:
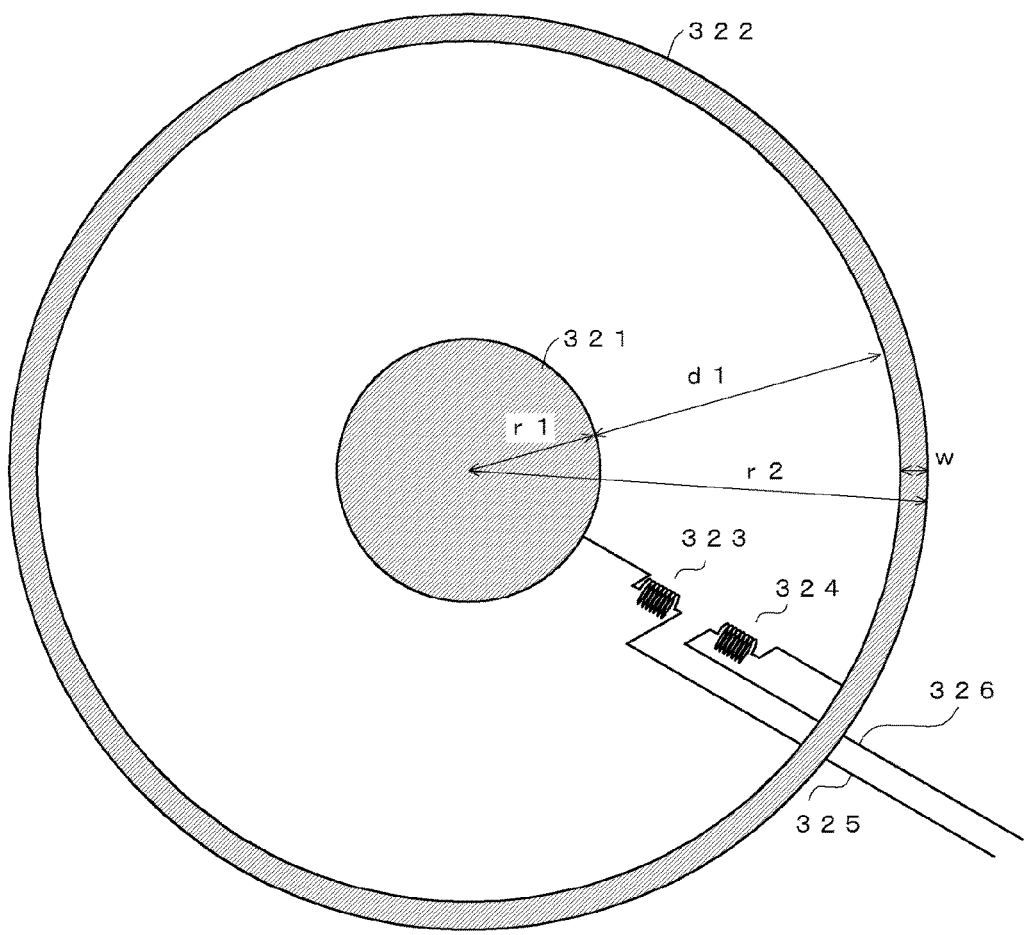
FIG. 10 is a plan view seeing the embodiment illustrated in FIG. 9 from a Z direction.

Next, with reference to FIG. 9 and FIG. 10, a structural example of a wireless power transmission system according to an embodiment of the present invention will be described. FIG. 9 is a perspective view of the embodiment, and FIG. 10 is a plan view seeing the embodiment illustrated in FIG. 9 from a Z direction. In the embodiment illustrated in FIG. 9 and FIG. 10, a power transmission coupler 310 is constituted of a circular center electrode 311, a ring-shaped annular electrode 312, inductors 313, 314, and connection lines 315, 316, and a power reception coupler 320 is constituted of a circular center electrode 321, a ring-shaped annular electrode 322, inductors 323, 324, and connection lines 325, 326. In the examples of FIG. 9 and FIG. 10, sizes of the respective elements constituting the power transmission coupler 310 and the power reception coupler 320 are the same. Of course, even when the sizes of the respective elements are different, power can be transmitted by adjusting the sizes so that the resonance frequency is the same. Note that although only the electrodes are illustrated in the examples of FIG. 9 and FIG. 10, the electrodes can be formed on a substrate or base material formed of a glass epoxy substrate, a glass composite substrate, or the like, similarly to FIG. 1 and FIG. 2.

Here, the center electrode 311 is constituted of a platy conductive member (for example, a member of copper, aluminum, or the like) having a circular shape with a radius r1. The annular electrode 312 is constituted of a platy conductive member having an annular shape with an outer radius r2 and a width w. Note that the center electrode 311 and the annular electrode 312 are disposed on a same plane, and the distance between an outer periphery of the center electrode 311 and an inner periphery of the annular electrode 312 is d1. One end of the inductor 313 is connected to the center electrode 311, and the other end is connected to one end of the connection line 315. One end of the inductor 314 is connected to the annular electrode 312, and the other end is connected to one end of the connection line 316. The connection lines 315, 316 are, for example, constituted of a coaxial cable or a balanced cable. Other ends of the connection lines 315, 316 are connected respectively to output terminals of a not-illustrated alternating-current power generating unit. By connecting the alternating-current power generating unit to the power transmission coupler 310 by the connection lines 315, 316, a power transmission device is constituted. Note that a resonance frequency of a series resonance circuit due to capacitance C of a capacitor formed by the center electrode 311 and the annular electrode 312 and inductance L of the inductors 313, 314 is $f_c$.

The center electrode 321 is constituted of a platy conductive member having a circular shape with a radius r1. The annular electrode 322 is constituted of a platy conductive member having an annular shape with an outer radius r2 and a width w. The center electrode 321 and the annular electrode 322 are disposed on a same plane, and the distance between an outer periphery of the circular center electrode 321 and an inner periphery of the annular electrode 322 is d1. Further, the plane on which the center electrode 311 and the annular electrode 312 are disposed and the plane on which the center electrode 321 and the annular electrode 322 are disposed are kept substantially in parallel. One end of the inductor 323 is connected to the center electrode 321, and the other end is connected to one end of the connection line 325. One end of the inductor 324 is connected to the annular electrode 322, and the other end is connected to one end of the connection line 326. The connection lines 325, 326 are, for example, constituted of a coaxial cable or a balanced cable. Other ends of the connection lines 325, 326 are connected respectively to input terminals of a not-illustrated load. By connecting the load to the power reception coupler 320 by the connection lines 325, 326, a power reception device is constituted. Note that a resonance frequency $f_c$ of a series resonance circuit due to capacitance C of a capacitor formed by the center electrode 321 and the annular electrode 322 and inductance L of the inductors 323, 324 is set to be the same as that of the power transmission coupler 310.

Figure 11:
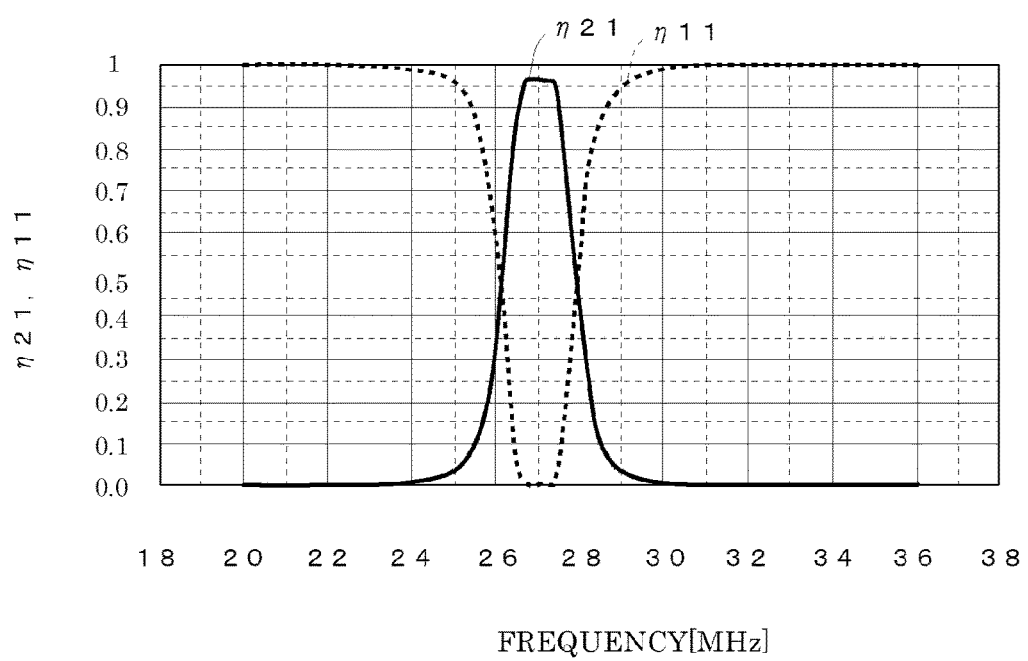
FIG. 11 is a diagram illustrating frequency characteristics of transmission efficiency and reflection loss of the wireless power transmission system illustrated in FIG. 9.

FIG. 11 is a diagram illustrating frequency characteristics of transmission efficiency $\eta 21$ ($=|S21|^2$) from the power transmission coupler 310 to the power reception coupler 320 and reflection loss $\eta 11$ ($=|S11|^2$), in the case where the power transmission coupler 310 and the power reception coupler 320 of the wireless power transmission system illustrated in FIG. 9 and FIG. 10 are disposed to oppose each other across a distance of 20 cm (the case where d2=20 cm). More particularly, the radius r1 of the center electrodes 311, 321 is 7 cm, the diameter r2 of outer peripheries of the annular electrodes 312, 322 is 24 cm, the width w of the annular electrodes 312, 322 is 1.5 cm, and d1 is set to 15.5 cm. Further, the inductors 313, 314, 323, 324 are each wound 13 times and set to have an inductance value of 2.8 μH. In FIG. 11, the horizontal axis denotes frequency (MHz) of transmitted alternating-current power, and the vertical axis denotes transmission efficiency. In the example illustrated in FIG. 9, a transmission efficiency of about 96% is achieved around 27 MHz.

Figure 12:
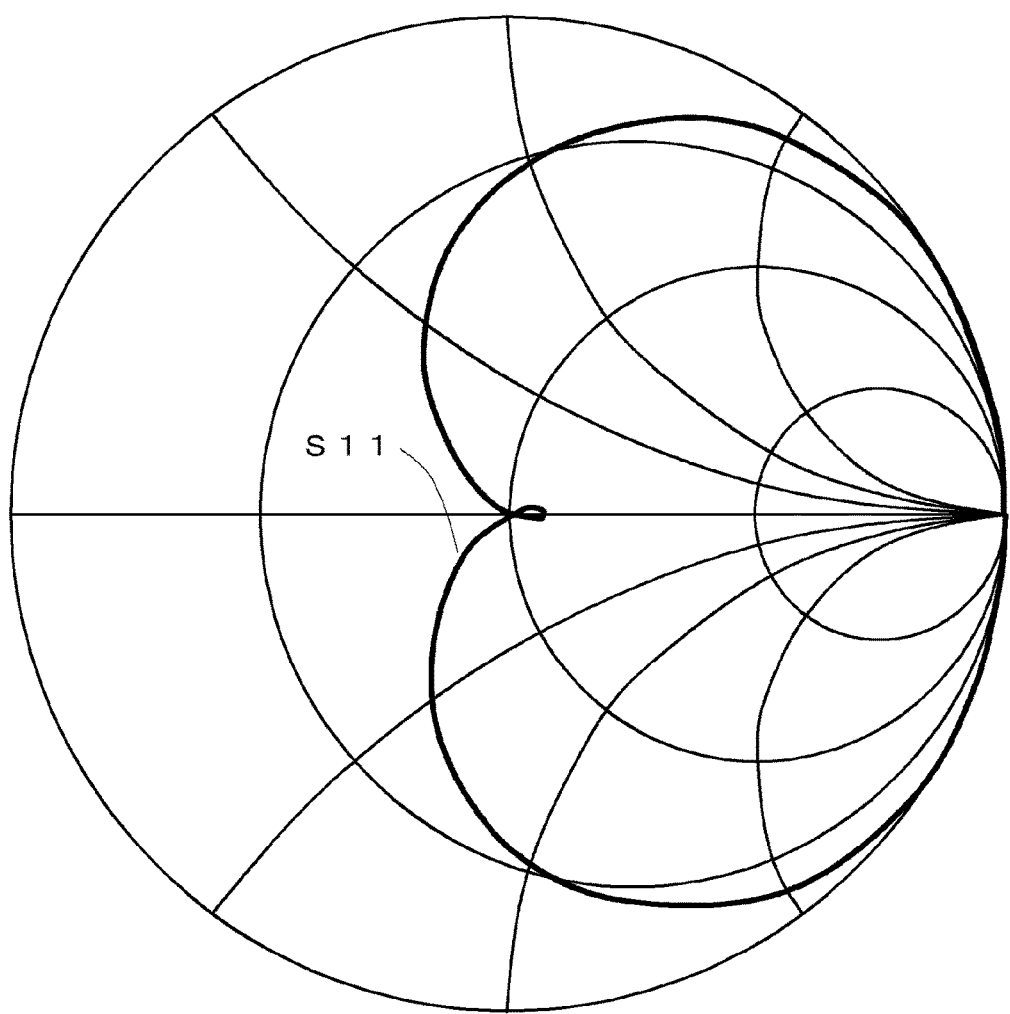
FIG. 12 is a diagram illustrating a smith chart of impedance of a power transmission coupler illustrated in FIG. 9.

FIG. 12 illustrates a smith chart of impedance S11 of the power transmission coupler 310 of the wireless power transmission system illustrated in FIG. 9 and FIG. 10. In this case, a port impedance of the measuring apparatus is set to a value equal to a characteristic impedance Z0 (real value) of a connection line. As illustrated in these diagrams, in the wireless power transmission system illustrated in FIG. 9 and FIG. 10, a trajectory of impedance of the power transmission coupler 310 passes near the center of circle of the smith chart, and thus power can be transmitted efficiently while suppressing reflections by setting to perform transmission near the center.

That is, in the embodiment illustrated in FIG. 9, the center electrode 311 and the annular electrode 312 are coupled by electric field resonance to the center electrode 321 and the annular electrode 322, and alternating-current power is transmitted by an electric field from the center electrode 311 and the annular electrode 312 to the center electrode 321 and the annular electrode 322. That is, in the embodiment illustrated in FIG. 9, since the center electrode 311 and the annular electrode 312 and the center electrode 321 and the annular electrode 322 are disposed across the distance d2 shorter than $\lambda/2\pi$ as a near field, the center electrode 321 and the annular electrode 322 are disposed in an area where electric field components emitted from the center electrode 311 and the annular electrode 312 are dominant. Further, a resonance frequency due to the capacitor formed between the center electrode 311 and the annular electrode 312 and the inductors 313, 314 and a resonance frequency due to the capacitor formed between the center electrode 321 and the annular electrode 322 and the inductors 323, 324 are set to be substantially equal. Thus, since the center electrode 311 and the annular electrode 312 are coupled by electric field resonance to the center electrode 321 and the annular electrode 322, the alternating-current power is transmitted efficiently from the power transmission coupler 310 to the power reception coupler 320 by the electric field.

Figure 13:
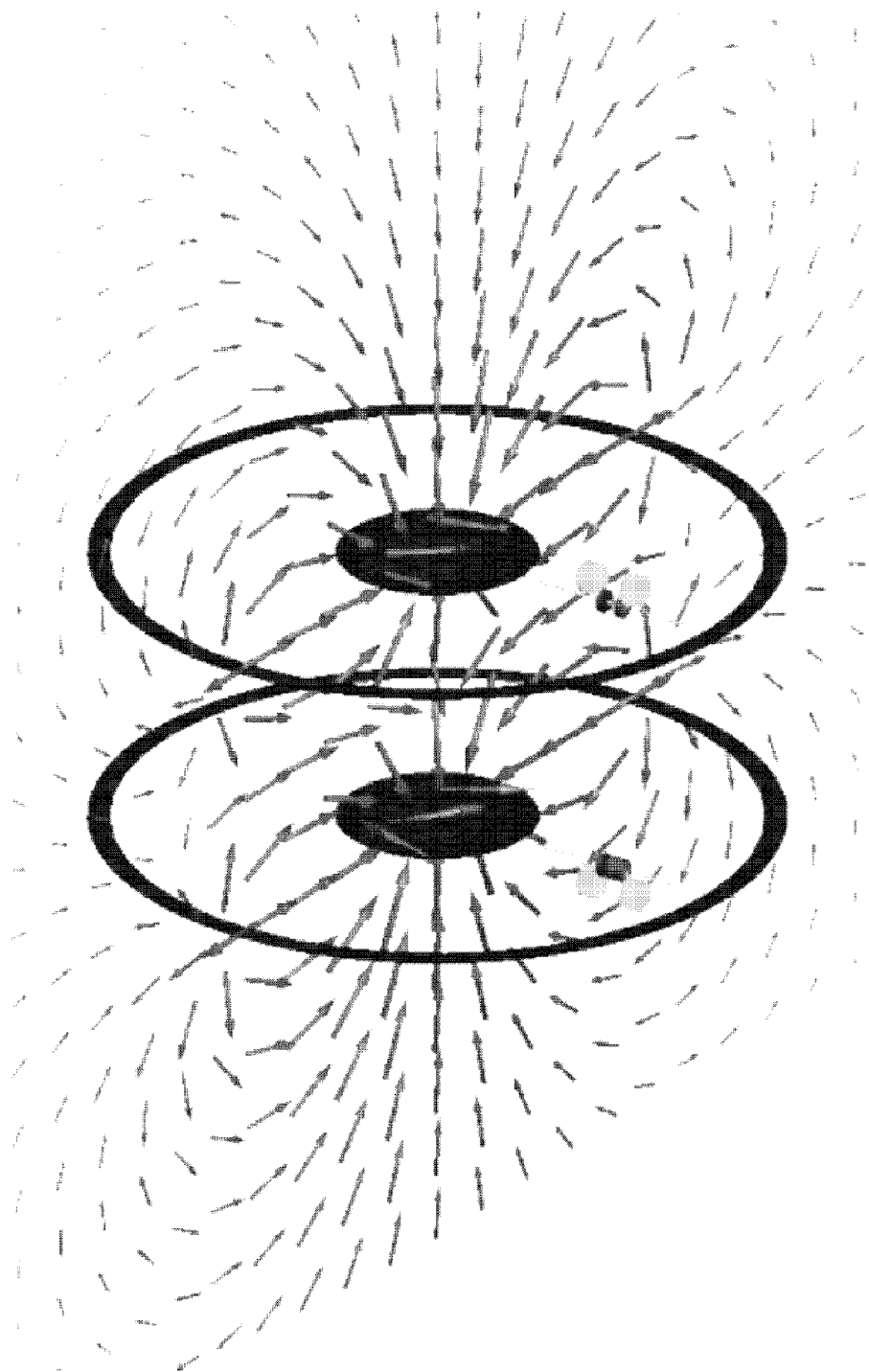
FIG. 13 is a diagram illustrating an electric field distribution of the embodiment illustrated in FIG. 9
Figure 14:
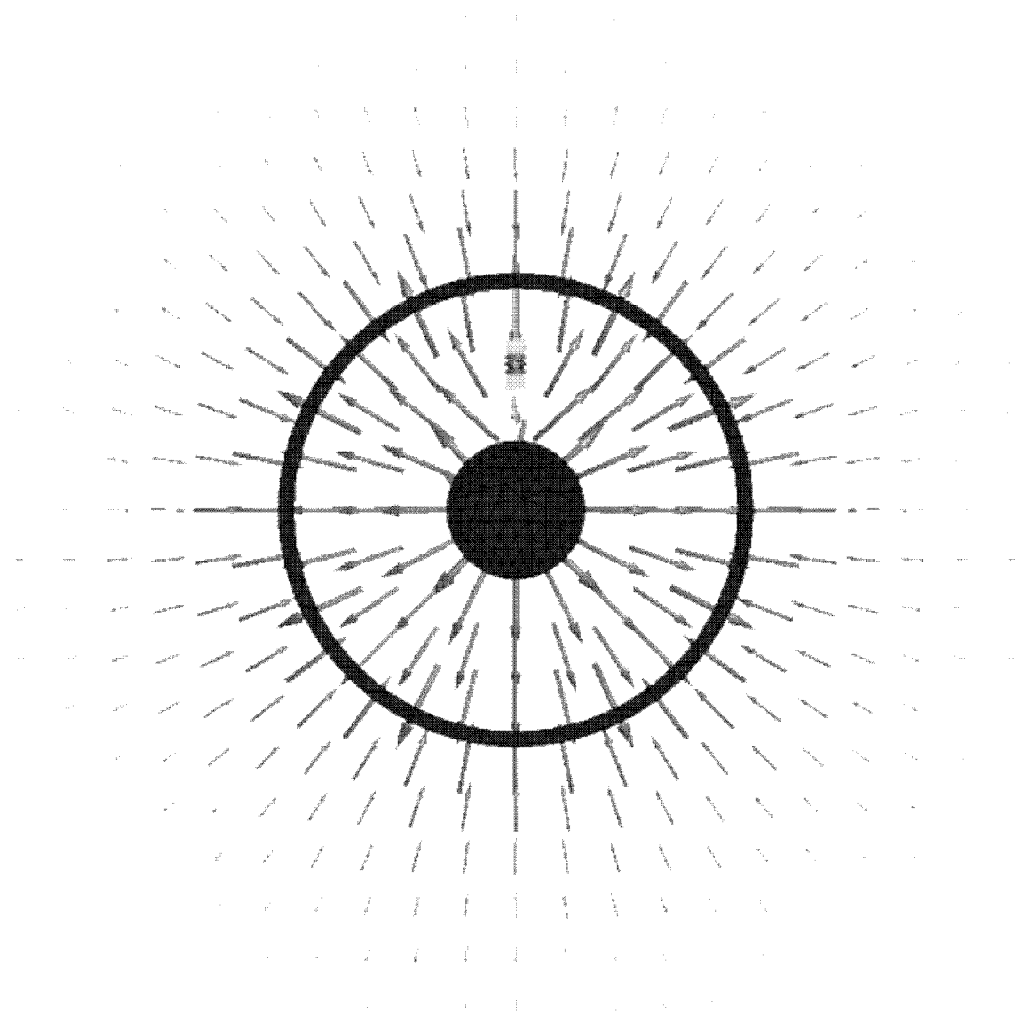
FIG. 14 is a diagram illustrating an electric field distribution of the embodiment illustrated in FIG. 10.

FIG. 13 is a diagram illustrating an electric field distribution of the embodiment illustrated in FIG. 9, and FIG. 14 illustrates the electric field distribution of FIG. 10. In these diagrams, the direction of an arrow indicates the direction of an electric field, and the size of an arrow indicates the intensity of an electric field. As illustrated in these diagrams, electric fields in the vicinities of the power transmission coupler 310 and the power reception coupler 320 are formed axially symmetrically with respect to the center axis of these couplers. Accordingly, when the power transmission coupler 310 and the power reception coupler 320 are rotated in either direction about the axis, deterioration in characteristics is small.

Figure 15:
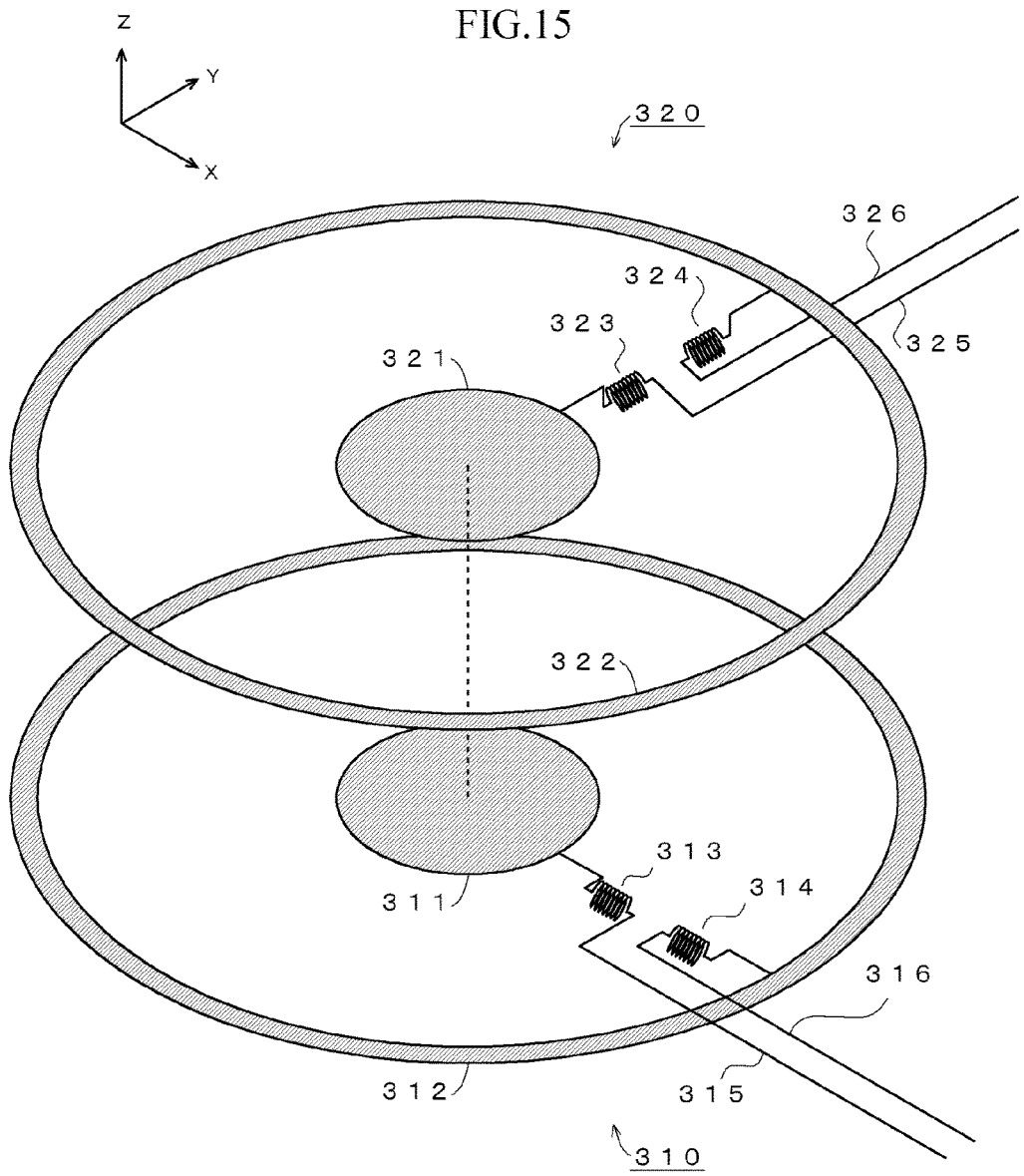
FIG. 15 is a view illustrating a state of the case where a power reception coupler illustrated in FIG. 9 is rotated 90 degrees counterclockwise.
Figure 16:
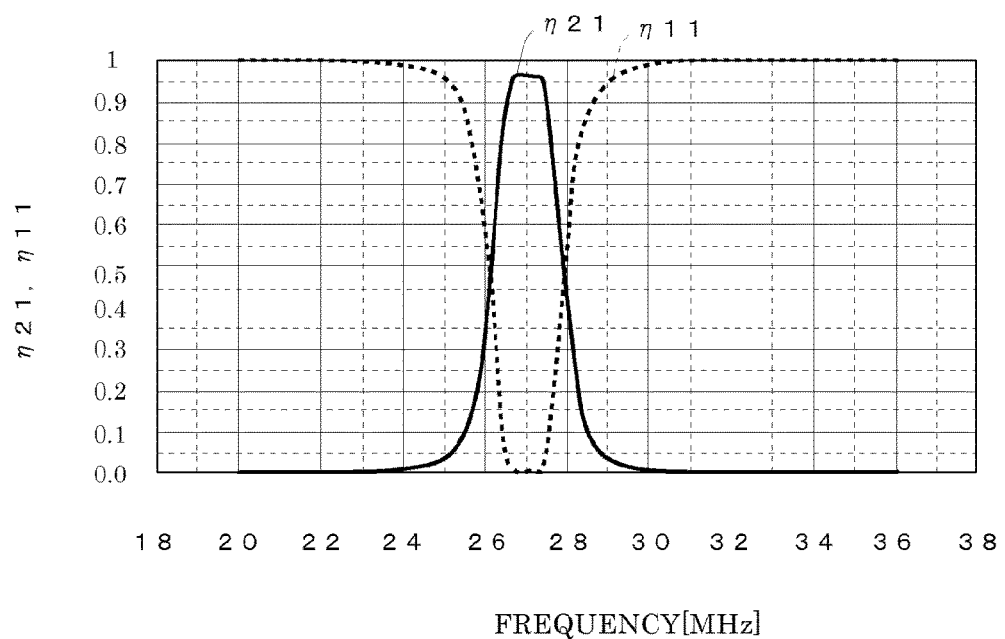
FIG. 16 is a diagram illustrating frequency characteristics of transmission efficiency and reflection loss of the wireless power transmission system illustrated in FIG. 15.
Figure 17:
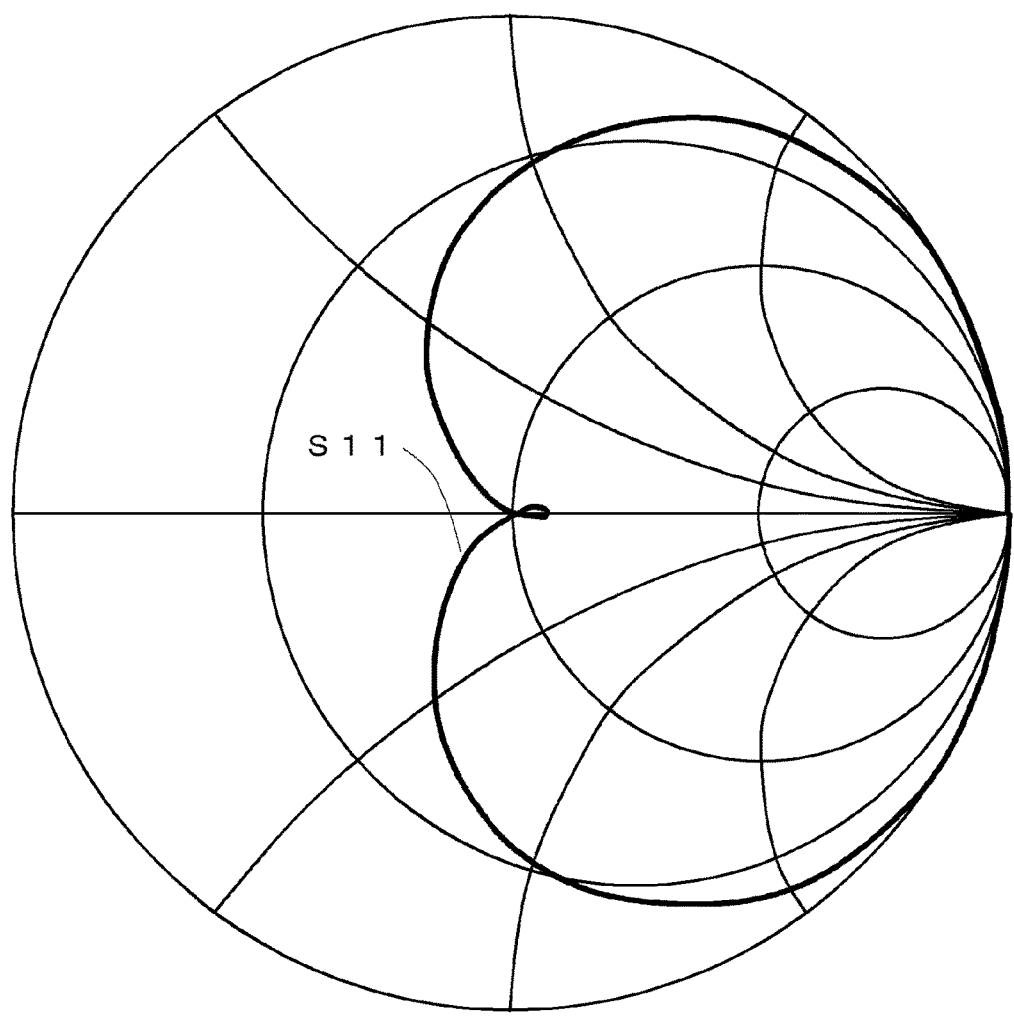
FIG. 17 is a diagram illustrating a smith chart of impedance of a power transmission coupler illustrated in FIG. 15.

FIG. 15 is a view illustrating a state that the power reception coupler 320 is rotated 90 degrees counterclockwise in the embodiment illustrated in FIG. 9. Further, FIG. 16 is a diagram illustrating frequency characteristics of transmission efficiency η21 from the power transmission coupler 310 to the power reception coupler 320 and reflection loss η11 in the state illustrated in FIG. 15, and FIG. 17 is a smith chart of impedance S11 of the power transmission coupler 310 in the same state. As illustrated in FIG. 16, a transmission efficiency at 27 MHz is about 96%, and there is no deterioration in characteristics from the state illustrated in FIG. 9. Further, as illustrated in FIG. 17, also regarding the input impedance, there is no change from the state illustrated in FIG. 9.

As described above, according to the embodiment of the present invention, it is possible to wirelessly transmit power from the power transmission coupler 310 to the power reception coupler 320 with high efficiency of 90 percent or more. Further, according to the embodiment of the present invention, even when the electrodes are rotated about the axis, changes in characteristics can be made quite small.

(C) Description of Variant Embodiments

Figure 18:
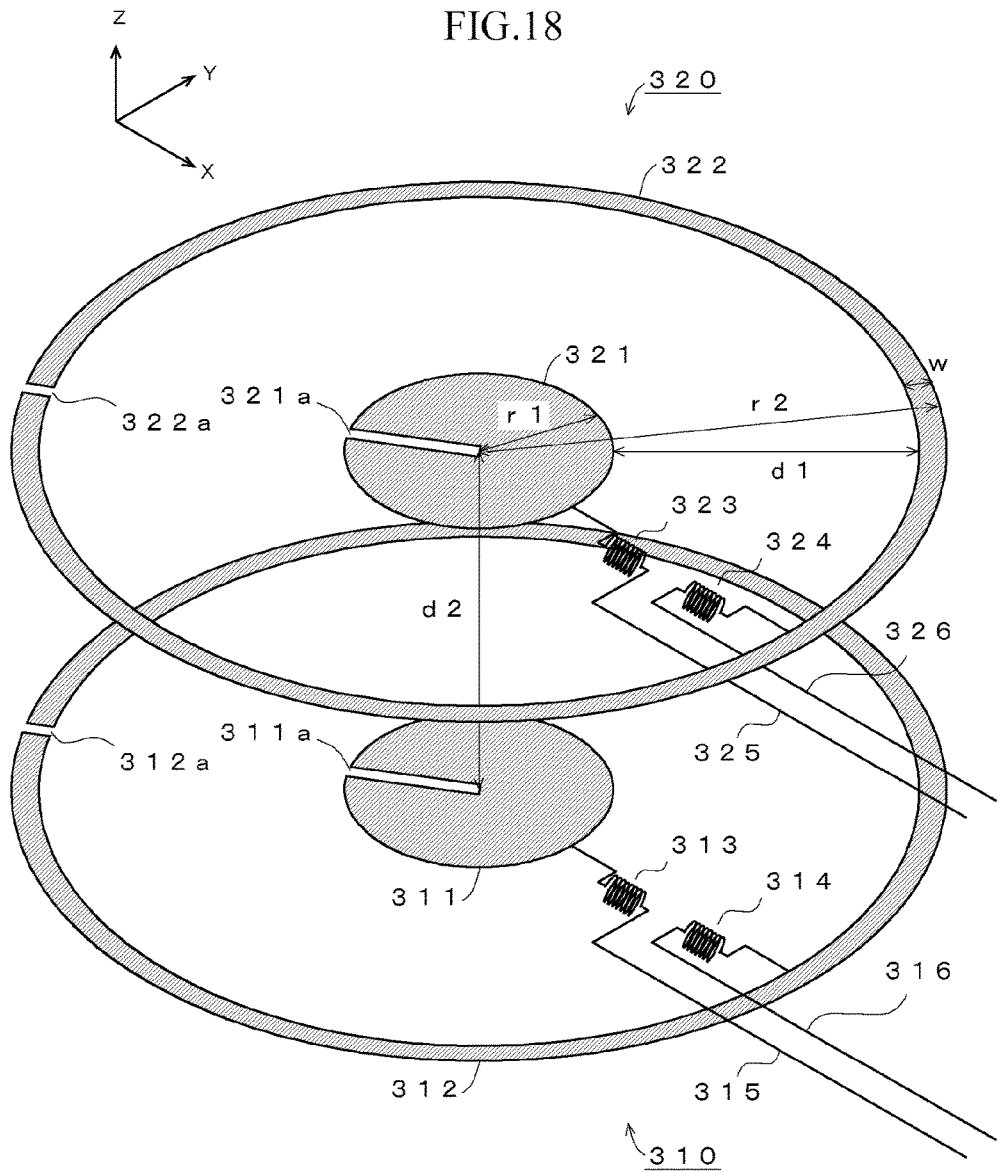
FIG. 18 is a view illustrating an example of a variant embodiment of the present invention.
Figure 19:
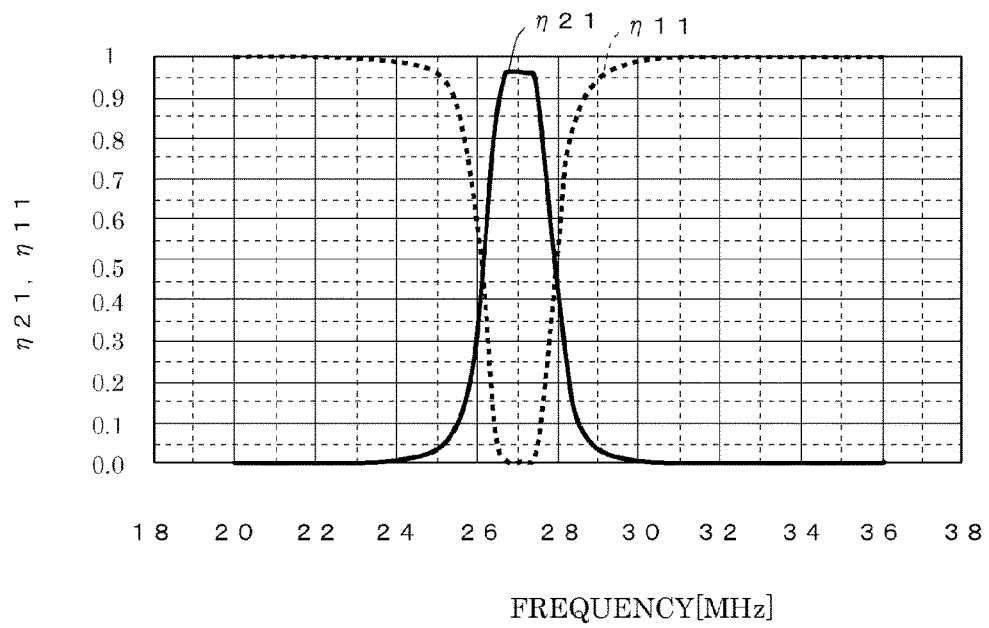
FIG. 19 is a diagram illustrating frequency characteristics of transmission efficiency and reflection loss of the wireless power transmission system illustrated in FIG. 18.
Figure 20:
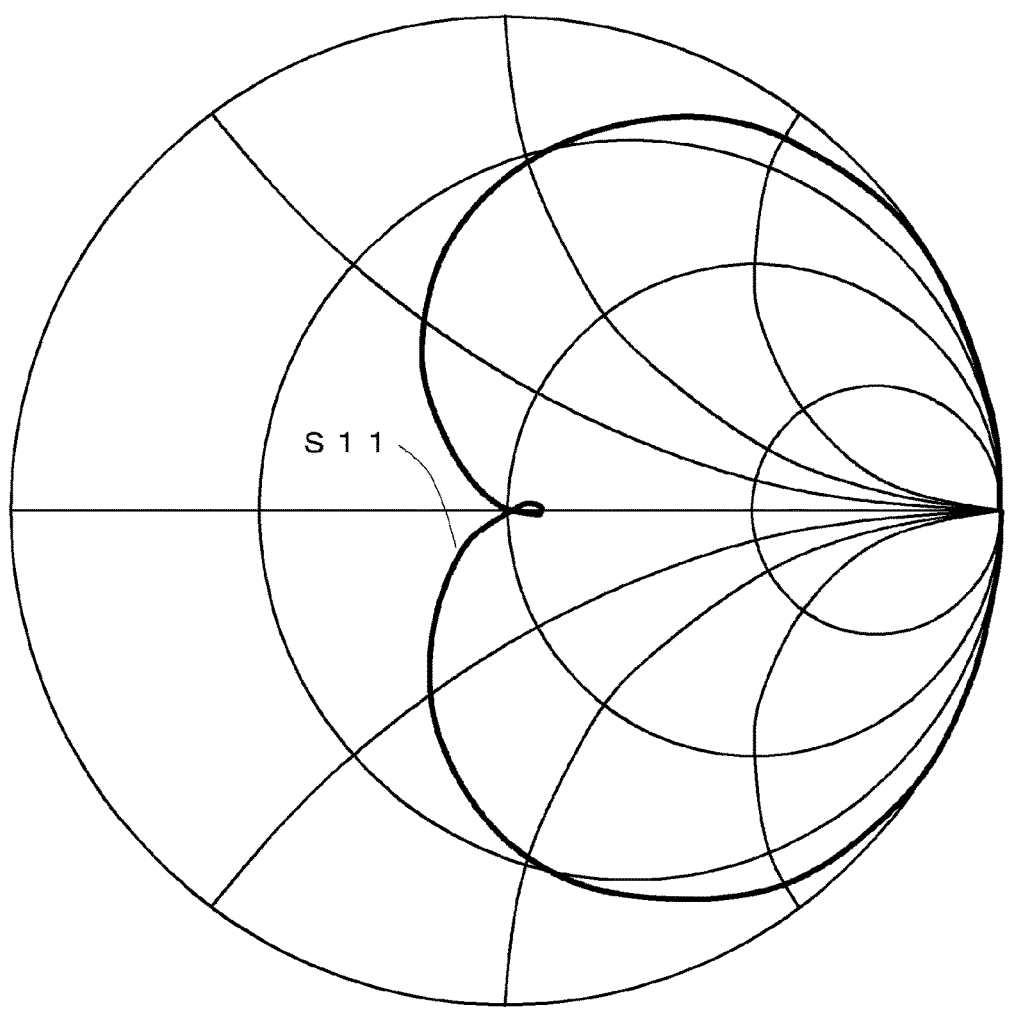
FIG. 20 is a diagram illustrating a smith chart of impedance of a power transmission coupler illustrated in FIG. 18.

The above embodiment is an example, and it is needless to mention that the present invention is not limited to the cases as described above. For example, in the above embodiment, the completely round center electrodes 311, 321 and the completely round annular electrodes 312, 322 are used, but for example, as illustrated in FIG. 18, the center electrodes 311, 321 may have cutouts 311a, 321a extending from the outer periphery to the center, and the annular electrodes 312, 322 may have cutouts 312a, 322a in a part. FIG. 19 illustrates frequency characteristics of transmission efficiency η21 and reflection loss η11 of the embodiment illustrated in FIG. 18, and FIG. 20 is a smith chart of input impedance S11. From comparison of these diagrams with FIG. 11 and FIG. 12, changes in characteristics hardly occur even when the cutouts are provided. Thus, when such cutouts are provided, the transmission efficiency hardly deteriorates.

Figure 21:
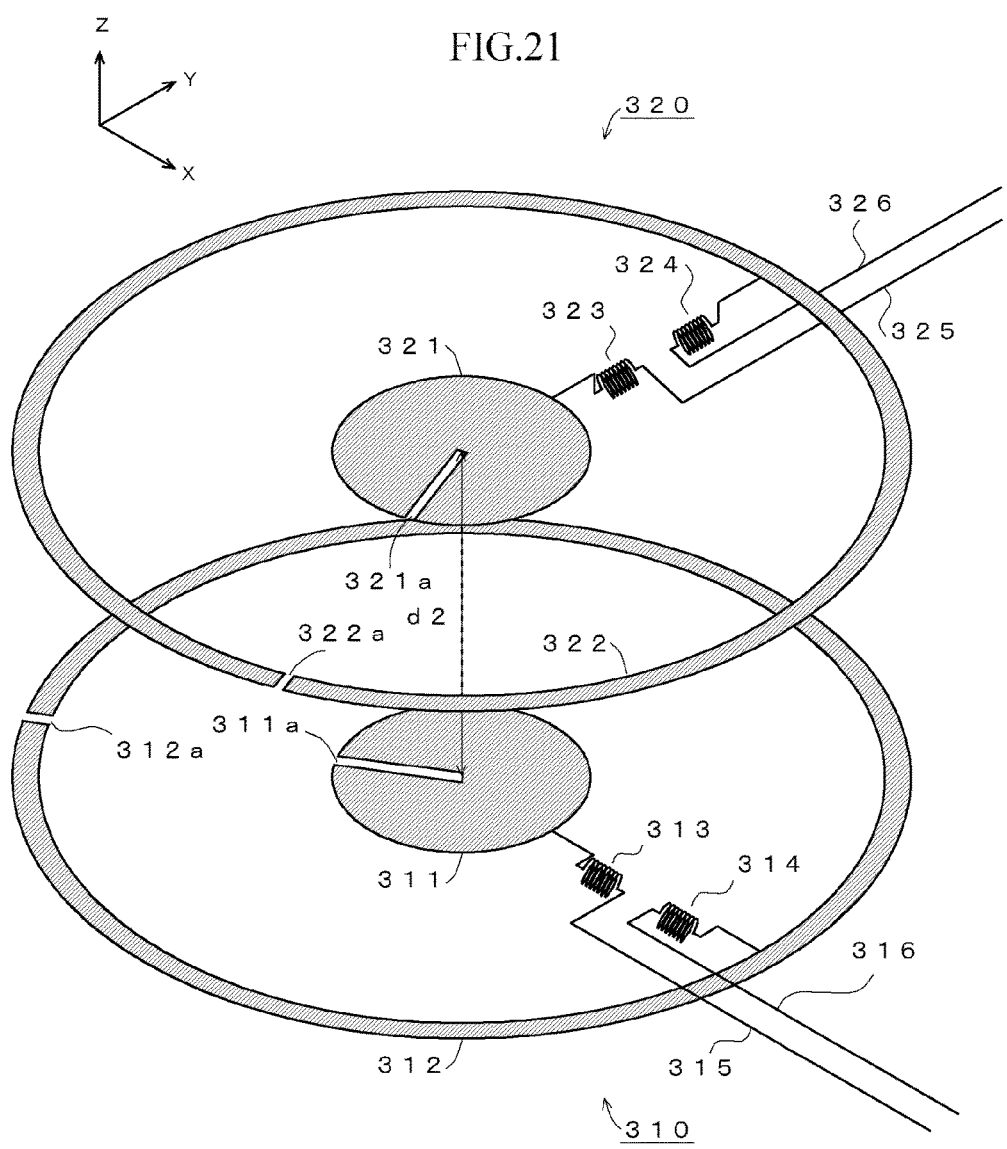
FIG. 21 is a view illustrating a state of the case where a power reception coupler illustrated in FIG. 18 is rotated 90 degrees counterclockwise.
Figure 22:
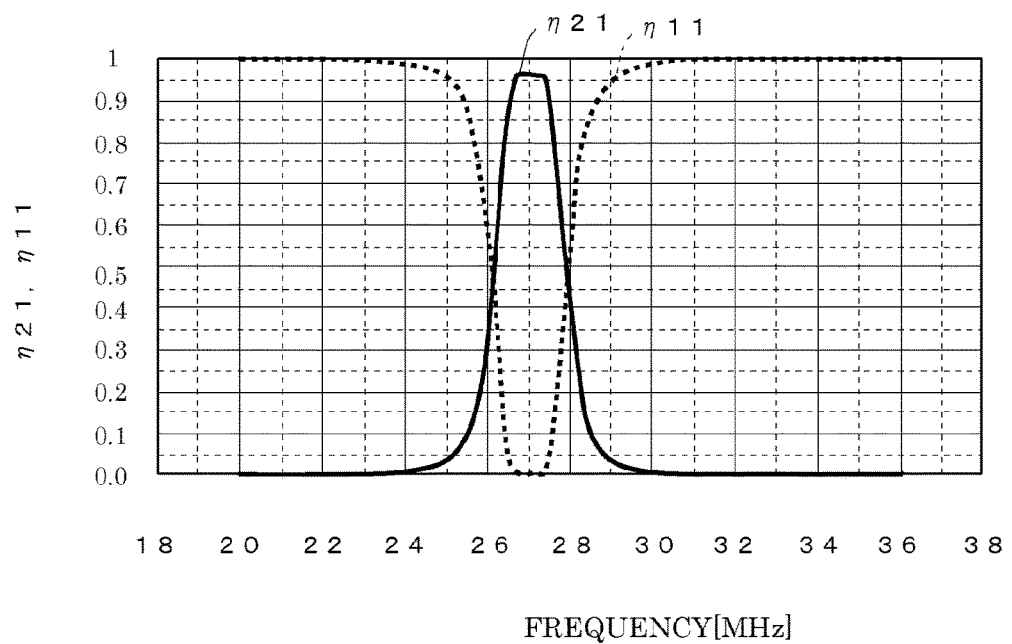
FIG. 22 is a diagram illustrating frequency characteristics of transmission efficiency and reflection loss of the wireless power transmission system illustrated in FIG. 21.
Figure 23:
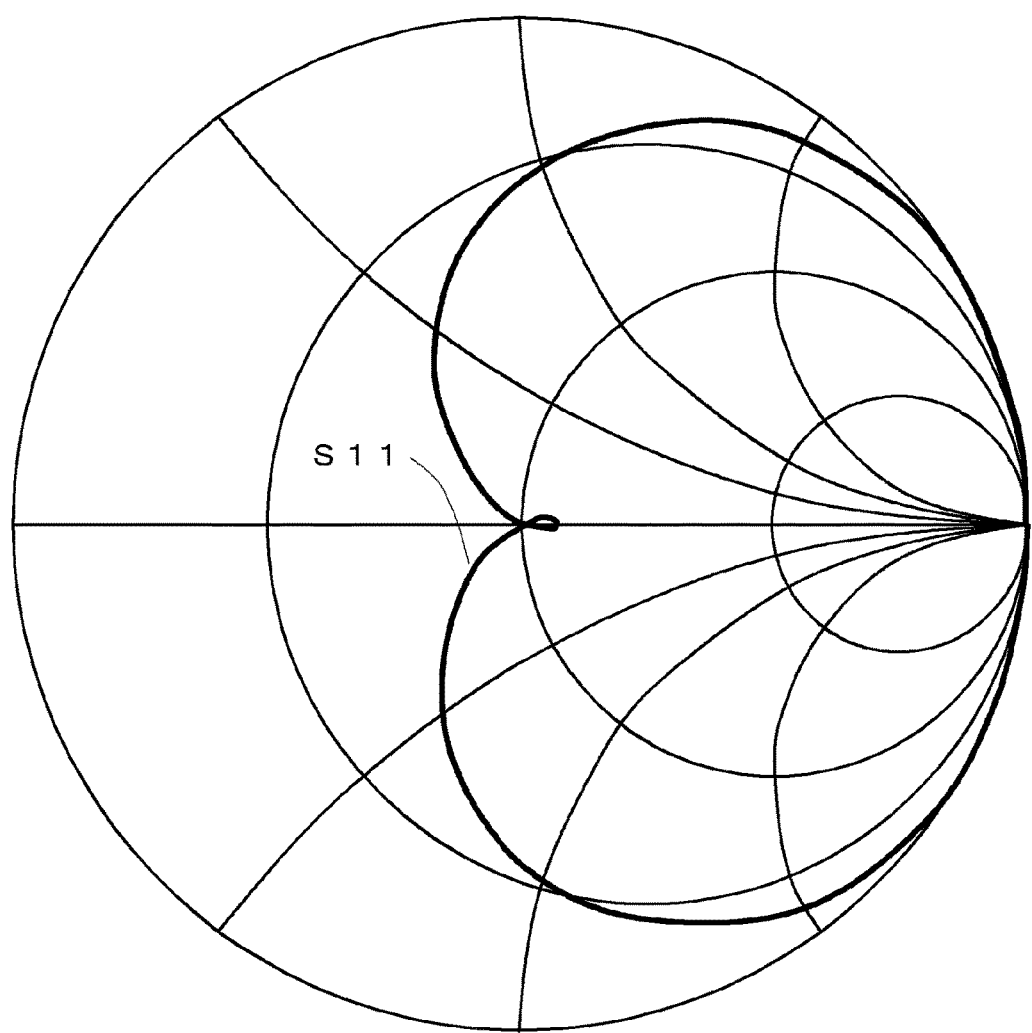
FIG. 23 is a diagram illustrating a smith chart of impedance of a power transmission coupler illustrated in FIG. 21.

FIG. 21 is a view illustrating a state that the power reception coupler 320 of FIG. 18 is rotated 90 degrees counterclockwise. In such a state, the positions of the cutouts 311a, 321a and the cutouts 312a, 322a do not correspond. However, changes in characteristics hardly occur even in such a state. More particularly, FIG. 22 illustrates frequency characteristics of transmission efficiency η21 and reflection loss η11 of the embodiment illustrated in FIG. 21, and FIG. 23 is a smith chart of input impedance S11. From comparison of these diagrams with FIG. 19 and FIG. 20, changes in characteristics hardly occur when the power reception coupler 320 is rotated. Of course, the same is true in the case where the power transmission coupler 310 is rotated. Note that in the example of FIG. 18, the cutouts are provided in all of the center electrodes 311, 321 and the annular electrodes 312, 322, but the cutouts may be provided in at least one of them.

Figure 24:
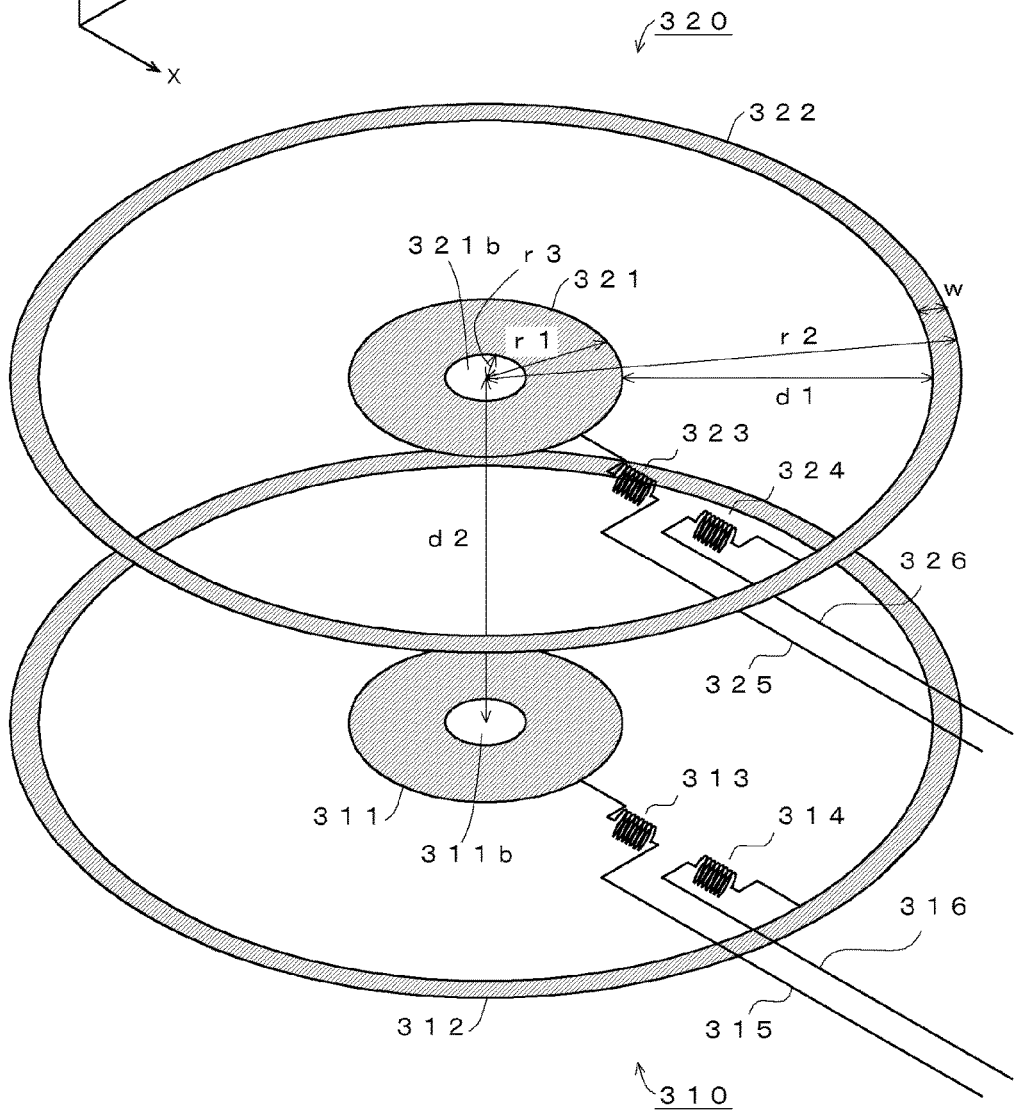
FIG. 24 is a view illustrating an example of another variant embodiment of the present invention.
Figure 25:
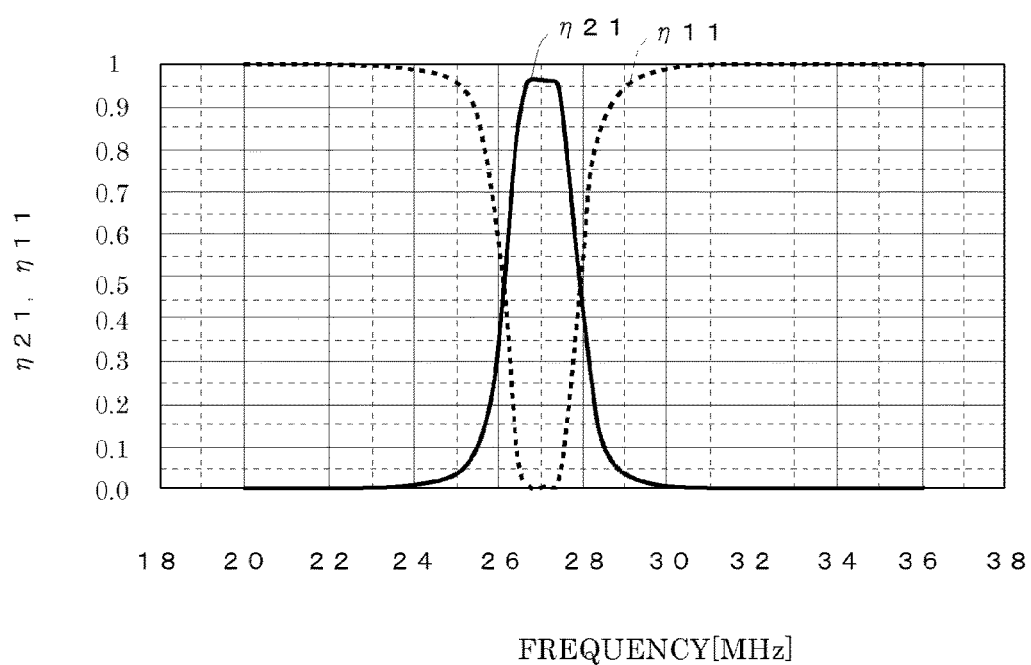
FIG. 25 is a diagram illustrating frequency characteristics of transmission efficiency and reflection loss of the wireless power transmission system illustrated in FIG. 24.
Figure 26:
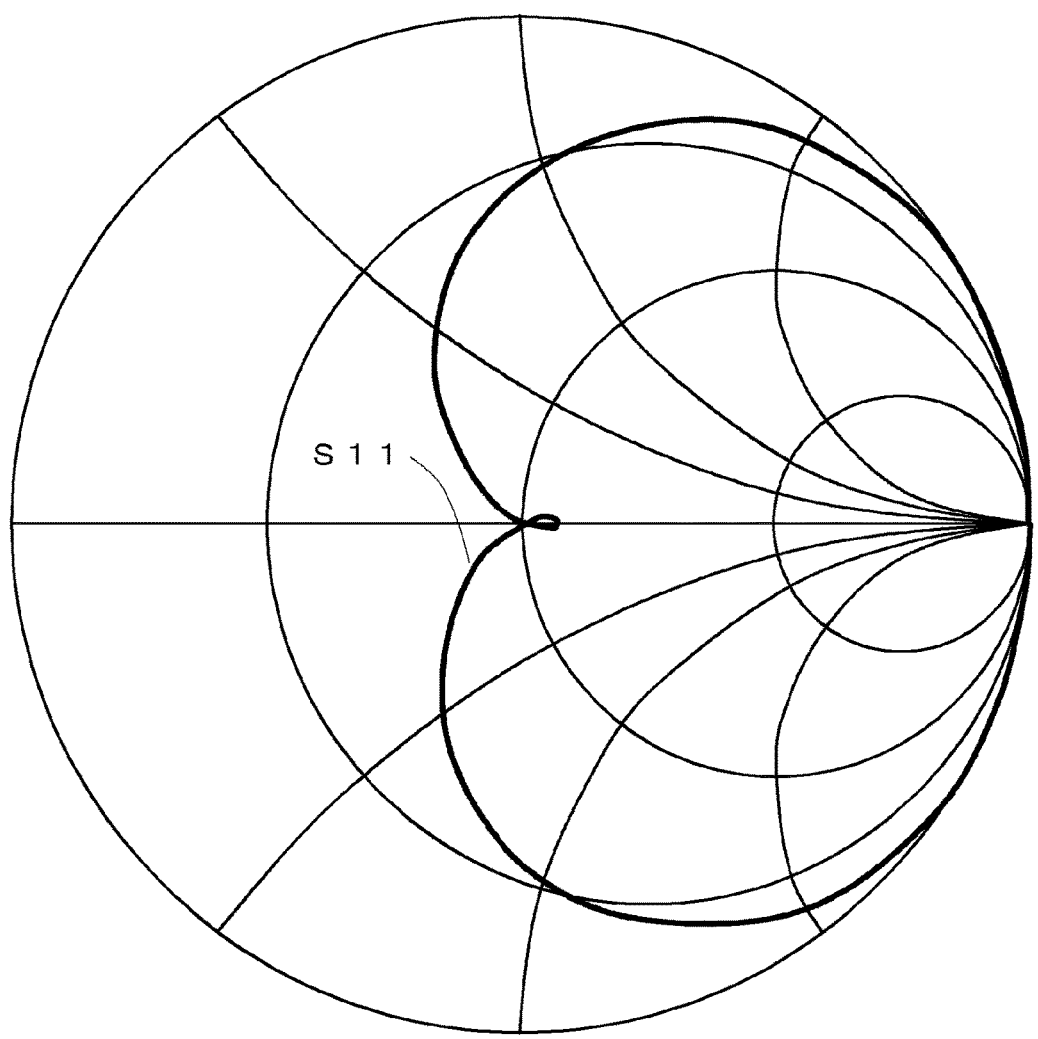
FIG. 26 is a diagram illustrating a smith chart of impedance of a power transmission coupler illustrated in FIG. 24.

FIG. 24 illustrates another variant embodiment. Specifically, FIG. 24 illustrates an embodiment in which the center electrodes 311, 321 are made annular by providing through holes 311b, 321b in the center electrodes 311, 321, respectively. In this example, the through holes 311b, 321b with a to radius r3 are formed in the centers of the center electrodes 311, 321, respectively. Note that the other structure is the same as in FIG. 9. FIG. 25 illustrates frequency characteristics of transmission efficiency η21 and reflection loss η11 of the embodiment illustrated in FIG. 24, and FIG. 26 is a smith chart of input impedance S11. From comparison of these diagrams with FIG. 11 and FIG. 12, changes in characteristics hardly occur even when the through holes 311b, 321b are provided in the center electrodes 311, 321. Thus, when such through holes 311b, 321b are provided, the transmission characteristic hardly deteriorates.

Figure 27:
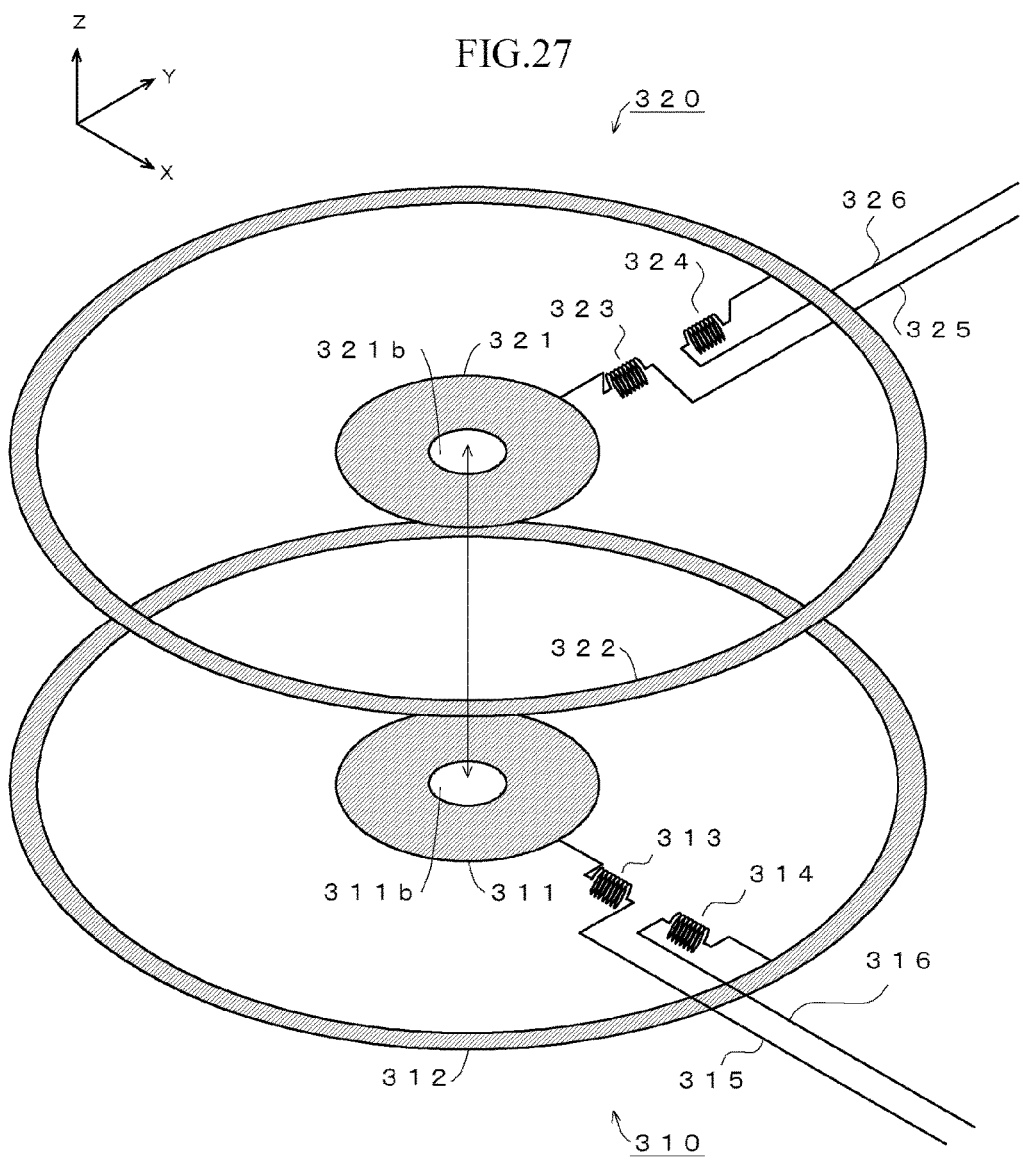
FIG. 27 is a view illustrating a state of the case where a power reception coupler illustrated in FIG. 24 is rotated 90 degrees counterclockwise.
Figure 28:
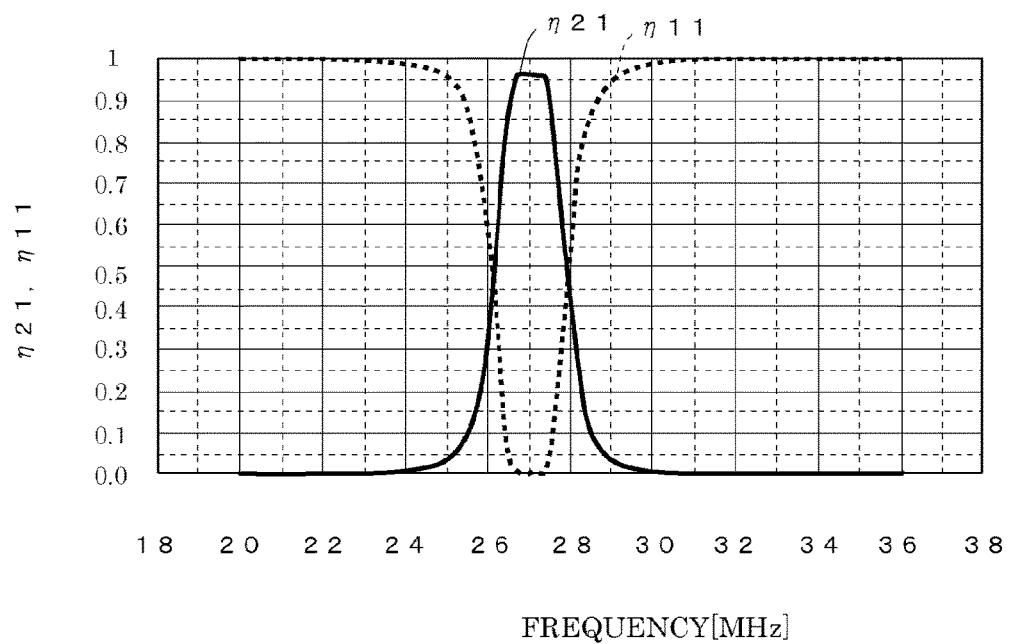
FIG. 28 is a diagram illustrating frequency characteristics of transmission efficiency and reflection loss of the wireless power transmission system illustrated in FIG. 27.
Figure 29:
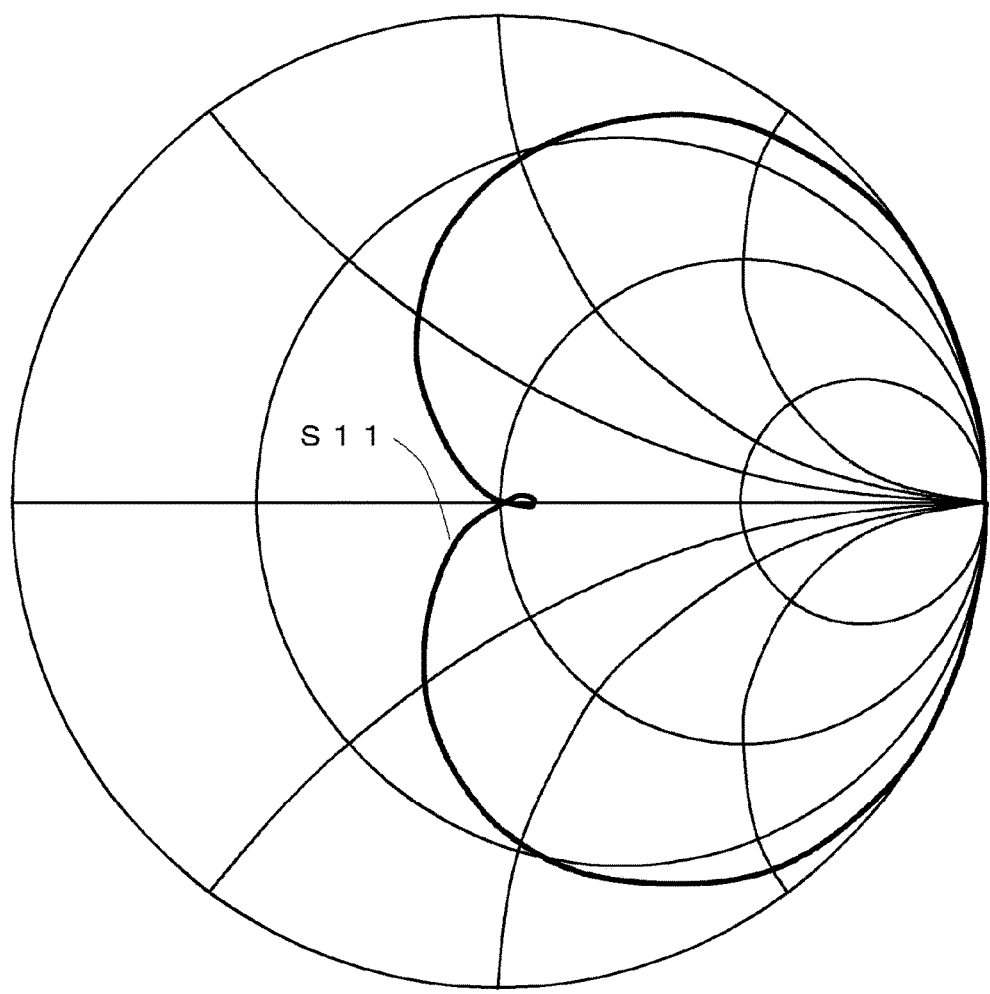
FIG. 29 is a diagram illustrating a smith chart of impedance of a power transmission coupler illustrated in FIG. 27.

FIG. 27 is a view illustrating a state that the power reception coupler 320 of FIG. 24 is rotated 90 degrees counterclockwise. In the embodiment of FIG. 24, since the through holes 311b, 321b are formed axially symmetrically, electric fields formed by the power transmission coupler 310 and the power reception coupler 320 become axially symmetrical similarly to FIG. 13 and FIG. 14. Thus, when the power reception coupler 320 is rotated as illustrated in FIG. 27, changes in characteristics hardly occur. More particularly, FIG. 28 illustrates frequency characteristics of transmission efficiency η21 and reflection loss η11 of the embodiment illustrated in FIG. 27, and FIG. 29 is a smith chart of input impedance S11. From comparison of these diagrams with FIG. 25 and FIG. 26, changes in characteristics hardly occur even when the power reception coupler 320 is rotated. Of course, the same is true in the case where the power transmission coupler 310 is rotated. Note that in the example of FIG. 24, the through holes are provided in both the center electrodes 311, 321, but they may be provided in at least one of them. Further, cutouts may be provided as necessary in at least one of the center electrodes 311, 321 and the annular electrodes 312, 322 as described above.

Further, in the above embodiments, the center electrode 311 and the center electrode 321 have the same size and the annular electrode 312 and the annular electrode 322 have the same size, but they may have different sizes. Further, the center electrodes 311, 321 and the annular electrodes 312, 322 are completely round, but they may be, for example, elliptic or polygonal. Further, the center electrode 311 and the annular electrode 312 and the center electrode 321 and the annular electrode 322 are disposed on the same planes respectively, but for example, they may be disposed to be displaced in an axial direction. Further, the center electrodes 311, 321 and the annular electrodes 312, 322 may be of curved or bent shape instead of the plate shape, or may be of a three-dimensional shape such as a sphere. Moreover, it may have a three-dimensional shape extended in an axial direction. Further, it may have a three-dimensional shape extended in an axial direction in a state of having cutouts or through holes.

Further, in the above embodiments, the inductors 313, 314 reside in both between the connection line 315 and the center electrode 311 and between the connection line 316 and the annular electrode 312, but an inductor may reside in only one of them. Similarly, in the power reception coupler 320, the inductors 323, 324 reside in both between the connection line 325 and the center electrode 321 and between the connection line 326 and the annular electrode 322, but an inductor may reside in only one of them. Further, in the above-described embodiment, the inductors are formed by winding conductor lines in a columnar shape, but it may be formed by, for example, one having a shape meandering on a plane as used in a microstrip line, or one having a spiral shape on a plane.

Figure 30:
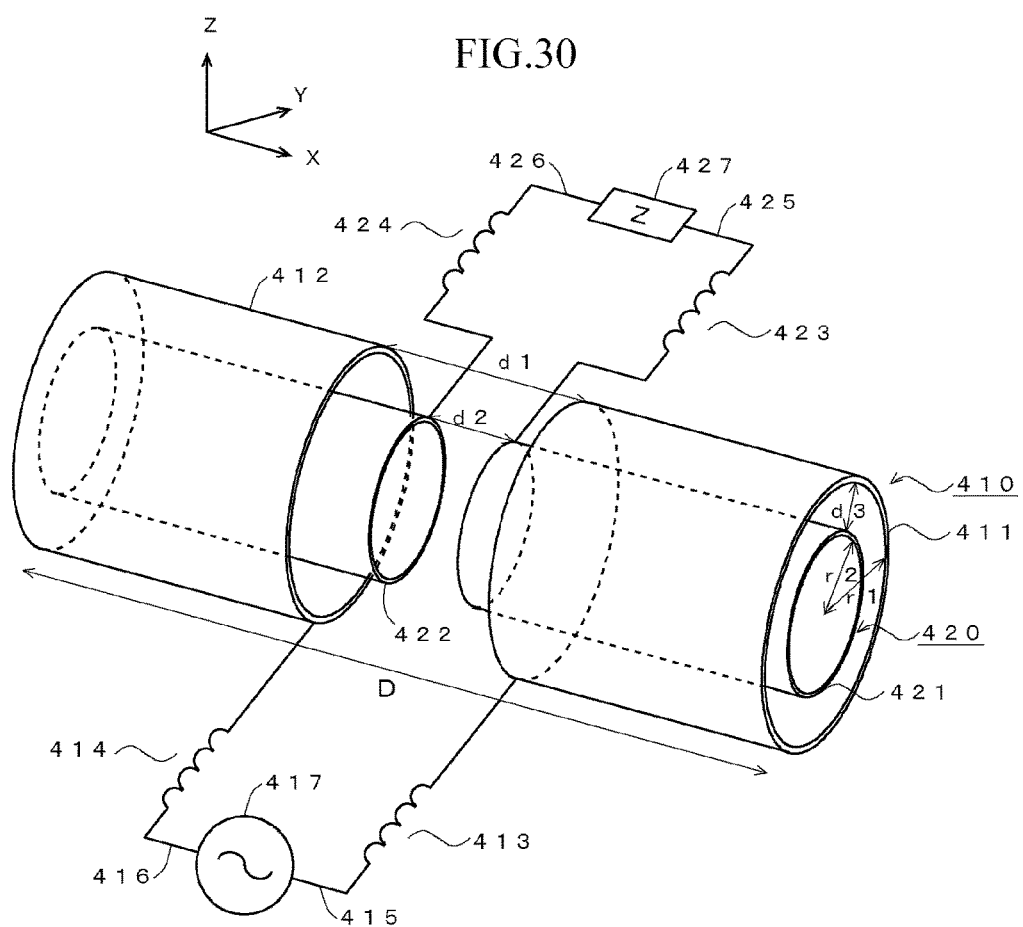
FIG. 30 is a view illustrating an example of another variant embodiment of the present invention.

Further, the above-described embodiments have the circular m electrodes and the annular electrodes, but for example, it is also possible to constitute them of cylindrical electrodes as illustrated in FIG. 30. The example of FIG. 30 has a power transmission coupler 410 and a power reception coupler 420. Here, electrodes 411, 412 constituting the power transmission coupler 410 are constituted of a conductive member having a is cylindrical shape with a radius r1. Note that although cylindrical members are used in the example of FIG. 30, it may be formed by curving rectangular conductive members to have a radius r1. In this case, ends of the conductive members may be either in contact or not in contact. The electrodes 411, 412 are disposed in parallel at positions separated by a predetermined distance d1 in an axial direction (X direction in the view). Further, a width D of the electrodes 411, 412 including the distance d1 is set to be narrower than a near field indicated by $\lambda/2\pi$ where the wavelength of electric fields emitted from these electrodes is $\lambda$. The electrodes 411, 412 are fixed via a not-illustrated insulating member (for example, a dielectric substrate). Further, the electrodes 411, 412 are connected to an alternating-current power supply 417 via inductors 413, 414 and connection lines 415, 416. Note that the power transmission coupler 410 is constituted of the electrodes 411, 412 and the inductors 413, 414.

Electrodes 421, 422 constituting the power reception coupler 420 are constituted of a conductive member having a cylindrical shape with a radius r2 (<r1). Note that although cylindrical members are used in the example of FIG. 30, it may be formed by curving rectangular conductive members to have a radius r2. In this case, ends of the conductive members may be either in contact or not in contact. The electrodes 421, 422 are disposed in parallel at positions separated by a predetermined distance d2 in an axial direction (X direction in the view). Further, the electrodes 421, 422 are disposed so that their center axis corresponds to that of the electrodes 411, 412. Further, a width D of the electrodes 421, 422 including the distance d2 is set to be narrower than a near field indicated by $\lambda/2\pi$ where the wavelength of electric fields emitted from these electrodes 411, 412 is $\lambda$. The electrodes 421, 422 are fixed via a not-illustrated insulating member (for example, a dielectric substrate). A gap between the electrodes 421, 422 and the electrodes 411, 412 is d3. Further, the electrodes 421, 422 are connected to a load 427 via inductors 423, 424 and connection lines 425, 426. The power reception coupler 420 is constituted of the electrodes 421, 422 and the inductors 423, 424. Note that a resonance frequency of the resonance circuit constituted of the electrodes 411, 412 and the inductors 413, 414 illustrated in FIG. 30 and a resonance frequency of the resonance circuit constituted of the electrodes 421, 422 and the inductors 423, 424 are set to be the same, and their principle of operation is similar to that of the case of FIG. 1. According to the embodiment illustrated in FIG. 30, power can be transmitted efficiently from the power transmission coupler 410 to the power reception coupler 420, and even when the power transmission coupler 410 or the power reception coupler 420 rotates about the center axis, decrease in transmission characteristics is small. Note that although the electrodes 411, 412, 421, 422 are circular cylinders in FIG. 30, they may be polygonal cylinders. Further, in the example of FIG. 30, the electrodes 411, 412 are structured to be longer in axial direction length than the electrodes 421, 422, but they may be the same, or the electrodes 421, 422 may be structured to be longer in axial direction length than the electrodes 411, 412.

EXPLANATION OF REFERENCE SIGNS 310 power transmission coupler
311 center electrode (first electrode)
311a cutout
311b through hole
312 annular electrode (second electrode)
312a cutout
313, 314 inductor
315, 316 connection lines
320 power reception coupler
321 center electrode (third electrode)
321a cutout
321b through hole
322 annular electrode (fourth electrode)
322a cutout
323, 324 inductor
325, 326 connection line
410 power transmission coupler
411 electrode (first electrode)
412 electrode (second electrode)
420 power reception coupler
421 electrode (third electrode)
422 electrode (fourth electrode)

The invention claimed is:
1. A wireless power transmission system transmitting alternating-current power from a power transmission device to a power reception device, wherein
the power transmission device comprises:
a first and a second electrode which are disposed across a predetermined distance, in which a total width including the predetermined distance is $\lambda/2\pi$ or less as a near field, the first and the second electrode each having a rotationally symmetrical shape with respect to a common center axis;
a first and a second connection line electrically connecting the first and the second electrode and two output terminals of an alternating-current power generating unit, respectively; and
a first inductor residing between the first and the second electrode and at least one of the two output terminals of the alternating current power generating unit, and
the power reception device comprises:
a third and a fourth electrode which are disposed across a predetermined distance, in which a total width including the predetermined distance is $\lambda/2\pi$ or less as a near field, the third and the fourth electrode each having a rotationally symmetrical shape with respect to a common center axis;
a third and a fourth connection line electrically connecting the third and the fourth electrode and two input terminals of a load, respectively; and
a second inductor residing between the third and the fourth electrode and at least one of the two input terminals of the load, wherein:
the electrodes of the power transmission device and the power reception device are disposed to oppose each other across a distance of $\lambda/2\pi$ or less as a near field,
a resonance frequency of a coupler constituted of the first and the second electrode and the first inductor and a resonance frequency of a coupler constituted of the third and the fourth electrode and the second inductor are set to be substantially equal, the first electrode has a first platy polygonal or circular shape, and the second electrode has a second platy polygonal or circular annular shape disposed to surround the first electrode and is disposed on a same plane to have a first center axis corresponding to that of the first electrode, the third electrode has a third platy polygonal or circular shape, and the fourth electrode has a fourth platy polygonal or circular annular shape disposed to surround the third electrode and is disposed on a same plane to have a second center axis corresponding to that of the third electrode, and the first and the second electrode and the third and the fourth electrode are disposed to oppose each other across a distance of $\lambda/2\pi$ or less as a near field.

2. The wireless power transmission system according to claim 1, wherein at least one of the first to the fourth electrode has a cutout in a radial direction.

3. The wireless power transmission system according to claim 1, wherein at least one of the first electrode and the third electrode has an annular shape.

4. The wireless power transmission system according to claim 1, wherein at least one of the first to the fourth electrode has a three-dimensional structure extending in an axial direction.

* * * * *